(12) United States Patent
Ukai et al.

(10) Patent No.: US 7,996,612 B2
(45) Date of Patent: Aug. 9, 2011

(54) COMPUTER SYSTEM FOR REDUCING POWER CONSUMPTION OF STORAGE SYSTEM AND METHOD FOR CONTROLLING THE SAME

(75) Inventors: Toshiyuki Ukai, Machida (JP); Tsuyoshi Tanaka, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 517 days.

(21) Appl. No.: 12/203,372

(22) Filed: Sep. 3, 2008

(65) Prior Publication Data
US 2009/0313427 A1    Dec. 17, 2009

(30) Foreign Application Priority Data
Jun. 16, 2008   (JP) .................................. 2008-156523

(51) Int. Cl.
| G06F 12/00 | (2006.01) |
| G06F 13/00 | (2006.01) |
| G06F 13/28 | (2006.01) |
| G06F 1/26 | (2006.01) |
| G06F 1/32 | (2006.01) |

(52) U.S. Cl. ........ 711/114; 711/154; 711/161; 711/163; 713/320

(58) Field of Classification Search .................. 711/114, 711/154, 163
See application file for complete search history.

(56) References Cited

U.S. PATENT DOCUMENTS

| 7,035,972 B2 | 4/2006 | Guha et al. |
| 7,404,035 B2 * | 7/2008 | Anzai et al. .................... 711/114 |
| 7,469,315 B2 * | 12/2008 | Watanabe et al. ............. 711/114 |
| 7,743,212 B2 * | 6/2010 | Hashimoto et al. ........... 711/114 |
| 7,849,280 B2 * | 12/2010 | Mizuno et al. ................ 711/162 |
| 7,904,651 B2 * | 3/2011 | Muramatsu et al. .......... 711/114 |
| 2005/0111249 A1 | 5/2005 | Yagisawa et al. |
| 2007/0067560 A1 | 3/2007 | Anzai et al. |
| 2007/0143542 A1 | 6/2007 | Watanabe et al. |
| 2007/0266211 A1 | 11/2007 | Hiraiwa et al. |

FOREIGN PATENT DOCUMENTS

| JP | 2005-157710 | 6/2005 |
| JP | 2007-86843 | 4/2007 |
| JP | 2007-164650 | 6/2007 |
| JP | 2007-286975 | 11/2007 |

* cited by examiner

*Primary Examiner* — Jack A Lane
(74) *Attorney, Agent, or Firm* — Brundidge & Stanger, P.C.

(57) ABSTRACT

To optimize performance and power consumption of a storage system having many disk drives, the storage system contains a plurality of volumes. A first number of the volumes belong to a first volume set. The first number of the remaining volumes belong to a second volume set. The volumes that belong to the first volume set are allocated dispersedly to a second number of disk drives. The volumes that belong to the second volume set are allocated dispersedly to a third number of disk drives, the third number being larger than the second number. A computer selects one of the first volume set and the second volume set based on a predetermined condition to store data dispersedly in the volumes belonging to the selected volume set. The computer stops spinning of disks in the disk drives to which none of the volumes belonging to the selected volume set are allocated.

20 Claims, 25 Drawing Sheets

EMPLOYED MODE INFORMATION 132

| | |
|---|---|
| 601 DEFAULT | MODE 2 (POWER-SAVING FIRST) |
| 602 SWITCH-FROM-DEFAULT-MODE PERMISSION/PROHIBITION | PERMITTED |
| 603 LAST | MODE 2 (POWER-SAVING FIRST) |
| 604 CURRENT | MODE 2 (POWER-SAVING FIRST) |
| 605 SWITCH-FROM-CURRENT-MODE PERMISSION/PROHIBITION | PERMITTED |
| 606 TEMPORARY | MODE 1 (PERFORMANCE FIRST) |

*FIG. 6*

LU SET SELECTION HINT INFORMATION 141

| |
|---|
| USED FILE PATH NAME ~901 |
| SPECIFIED-UPON-FILE-USE OPTION ~902 |
| USED FILE ATTRIBUTE ~903 |
| ENVIRONMENTAL VARIABLE ~904 |
| JOB EXECUTING USER ID ~905 |
| JOB EXECUTING GROUP ID ~906 |
| EXECUTED JOB NAME ~907 |
| EXECUTED JOB PROCESS ID ~908 |
| PARENT PROCESS NAME ~909 |
| PARENT PROCESS ID ~910 |

*FIG. 9*

SUB-DATA UPDATE NOTIFICATION EXCLUSION INFORMATION 135

| CLASSIFICATION | EXCLUDED ITEM |
|---|---|
| META DATA (DATA FOR MANAGING SUB-DATA) | UPON-MOUNTING UPDATE INFORMATION, atime(ACCESS TIME) |
| DATA (DIRECTORY) | /tmp |
| DATA (FILE) | /large/log, /large/messages* (FILE) |

*FIG. 20*

142. SUB-DATA UPDATE INFORMATION

| SUB-DATA (2101) | UPDATED (INITIAL VALUE : No) (2102) | NOTIFIED (INITIAL VALUE : No) (2103) |
|---|---|---|
| 1 | YES | YES |
| 2 | YES | YES |
| 3 | YES | NO |
| : | : | : |
| 16 | NO | - |

FIG. 21

CONFIGURATION DEFINITION INFORMATION 411

FILE SYSTEM MOUNT LOCATION INFORMATION 412

SELECTED LU SET INFORMATION 421

COMPUTER SYSTEM FOR REDUCING POWER CONSUMPTION OF STORAGE SYSTEM AND METHOD FOR CONTROLLING THE SAME

CLAIM OF PRIORITY

The present application claims priority from Japanese application JP2008-156523 filed on Jun. 16, 2008, the content of which is hereby incorporated by reference into this application.

BACKGROUND

This invention relates to management of power consumption and performance of a storage system. More particularly, a technology disclosed herein relates to a file system that provides data access in accordance with a policy regarding power consumption and performance.

Storage systems are becoming larger in scale as the amount of data handled by computer systems increases. Large-scale storage systems are used in data centers and the like, and their increased power consumption is posing a problem.

A technology called massive arrays of idle disks (MAID) has been proposed to deal with this problem (see U.S. Pat. No. 7,035,972). The MAID reduces the power consumption of a storage system by stopping the spinning of the disks in a disk drive that is not in use.

The MAID is applied to a storage system that is capable of power supply control (see JP 2005-157710 A). According to JP 2005-157710 A, in the case where a plurality of disk drives constitute redundant arrays of inexpensive disks (RAID), power supply is controlled separately for each management unit of a plurality of disk drives constituting the RAID.

When access to a disk drive that has stopped the spinning of its disks is requested, the access is executed after the disk drive is started up and the disks start spinning. The period of time required to start up the disk drive lowers the access performance. JP 2007-86843 A and JP 2007-164650 A disclose a technology of preventing the lowering of access performance from this cause by selecting a disk drive that is to store data based on the access frequency of the data. Specifically, the data storage location is selected such that data with a high access frequency is stored in a disk drive that is controlled to stop the spinning of its disks for a short period of time (or a disk drive that is controlled to never stop the spinning of its disks).

Another known technology of improving the access performance is to store data in a plurality of disk drives in a dispersed manner. Generally, the access performance (specifically, I/O throughput) improves more when data is dispersed among more disk drives. However, when data of one file, for example, is stored dispersedly among a plurality of disk drives, all those disk drives have to be accessed to read the file. Dispersing data in many disk drives therefore means that many disk drives need to be started up to read a single file.

JP 2007-286975 A discloses a technology of determining the placement of data in accordance with a policy regarding the above-mentioned access performance and start-up time. Specifically, in the case where improving the access performance is given priority, data is stored dispersedly in a relatively small number of disk drives, whereas data is stored dispersedly in a relatively large number of disk drives in the case where keeping the disk drive start-up time short is given priority.

SUMMARY

As mentioned above, dispersing data to be stored among more disk drives improves the access performance more. If the MAID is applied to those disk drives, however, dispersing data to be stored among more disk drives means more disk drives to be started up and accessed, thereby lowering the effect of reducing power consumption. Power consumption and the achieved performance thus have a trade-off relation.

Another fact to be considered is that the access performance required in accessing the same file varies depending on the characteristics of the job executed and other factors. For instance, executing numerous jobs in a batch environment requires a high I/O throughput whereas referring to a file in the normal dialogue environment does not require so high an I/O throughput. It has not been possible in the past to optimize the access performance and power consumption in cases as the one described above by switching to data placement that suits the characteristics of the job executed or the like.

According to a representative invention disclosed in this application, there is provided a computer system, comprising: a computer; and a storage system coupled to the computer through a network, wherein: the computer has an interface, which is coupled to the network, a processor, which is coupled to the interface, and a memory, which is coupled to the processor; the storage system has a plurality of disk drives and a controller, which controls the plurality of disk drives; the plurality of disk drives provide a data storage area that is partitioned into a plurality of logical volumes; the plurality of logical volumes include a first number of first logical volumes and as many second logical volumes as the first number; each of the plurality of logical volumes belongs to one of a plurality of volume sets; the plurality of volume sets include a first volume set to which the first number of the first logical volumes belong and a second volume set to which the first number of the second logical volumes belong; the first number of the first logical volumes are allocated dispersedly to a second number of the disk drives; the first number of second logical volumes are allocated dispersedly to a third number of the disk drives, the third number being larger than the second number; and the computer holds management information which associates each of the first logical volumes and each of the second logical volumes with each other, and is configured to: select one of the first volume set and the second volume set based on a result of judging whether or not a predetermined condition is met; store data of a file dispersedly in the first number of the logical volumes belonging to the selected volume set; and send an instruction to the storage system to stop spinning of disks in the disk drives to which none of the first number of the logical volumes belonging to the selected volume set are allocated.

According to an embodiment of this invention, the same file may be accessed at varying access performance and power consumption levels so that the access performance and power consumption are optimized for the characteristics of the job executed or the like.

BRIEF DESCRIPTION OF THE DRAWINGS

FIG. 6 is an explanatory diagram of employed mode information according to the embodiment of this invention.

FIG. 9 is an explanatory diagram of LU set selection hint information according to the embodiment of this invention.

FIG. 20 is an explanatory diagram of sub-data update notification exclusion information according to the embodiment of this invention.

FIG. 21 is an explanatory diagram of sub-data update information according to the embodiment of this invention.

DETAILED DESCRIPTION OF THE PREFERRED EMBODIMENT

An embodiment of this invention will be described below with reference to accompanying drawings.

Figure 1:
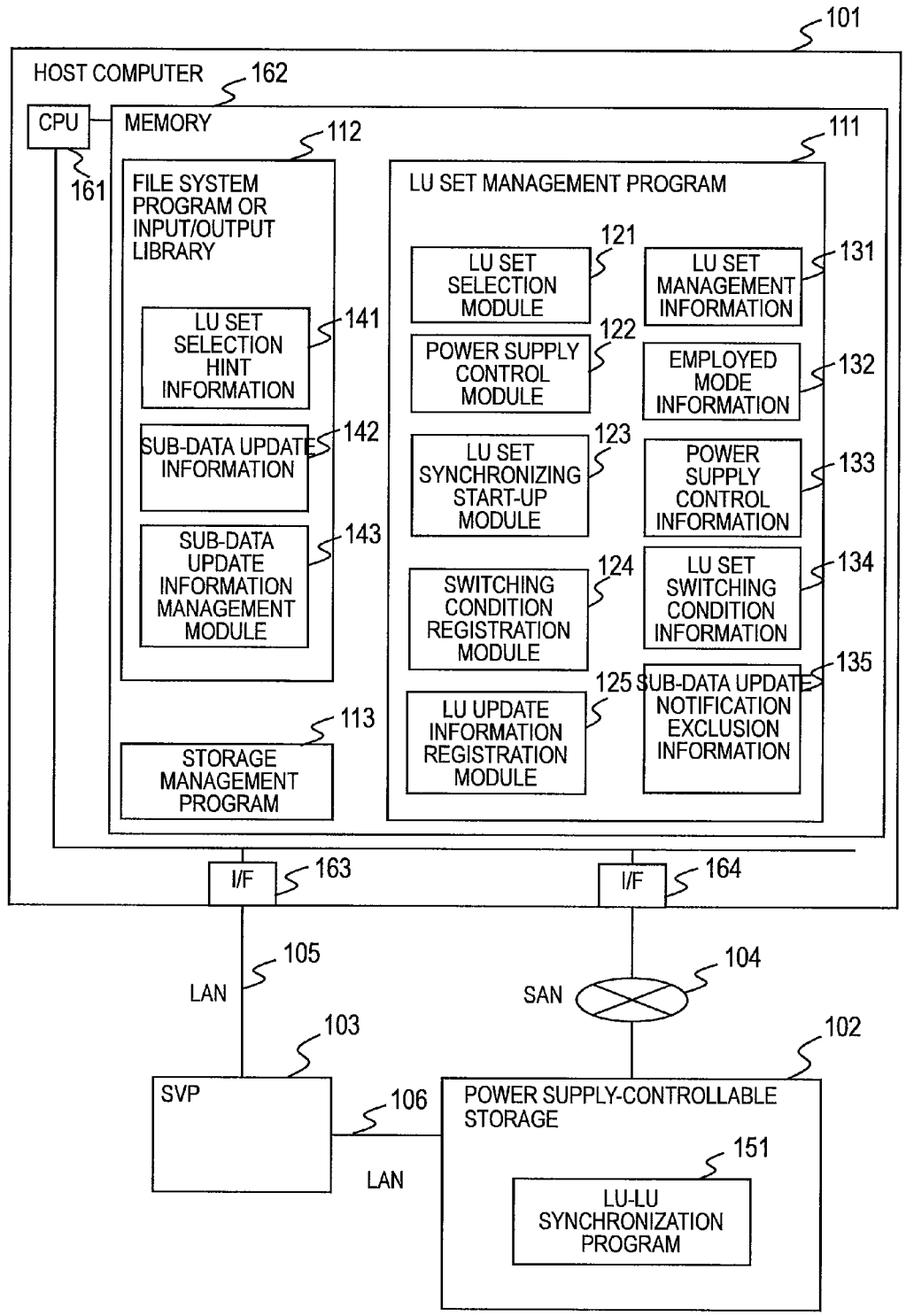
FIG. 1 is a diagram showing a configuration of a computer system according to an embodiment of this invention.

FIG. 1 is a diagram showing a configuration of a computer system according to the embodiment of this invention.

The computer system of this embodiment has a host computer 101, a service processor (SVP) 103, and a power supply-controllable storage system 102 (hereinafter simply referred to as "storage system 102"). The host computer 101 is coupled to the SVP 103 through a local area network (LAN) 105, and to the storage system 102 through a storage area network (SAN) 104. The storage system 102 is coupled to the SVP 103 through a LAN 106.

The host computer 101 is a computer that implements various applications using the storage system 102. The host computer 101 of this embodiment has a CPU 161, a memory 162, an interface (I/F) 163, and an I/F 164, which are coupled to one another.

The CPU 161 is a processor that executes programs stored in the memory 162. Processing that the respective programs execute in the following description is actually executed by the CPU 161.

The memory 162 is a storage device that stores programs executed by the CPU 161, data referred to by the CPU 161, and others. When the memory 162 is a semiconductor memory, for example, a DRAM, those programs, data, and others may be stored in a hard disk drive (not shown), whereby all or some of them are copied to the memory 162 as the need arises.

The memory 162 of this embodiment stores at least an LU set management program 111, a file system program or input/output library 112, and a storage management program 113.

The LU set management program 111 is a program for managing LU sets each of which is constituted of a plurality of logical volumes (logical units: LUs). The LU set management program 111 contains an LU set selection module 121, a power supply control module 122, an LU set synchronizing start-up module 123, a switching condition registration module 124, an LU update information registration module 125, LU set management information 131, employed mode information 132, power supply control information 133, LU set switching condition information 134, and sub-data update notification exclusion information 135. Those modules and information will be described later in detail.

The file system program or input/output library 112 may be a file system program provided as part of an operating system (OS) (not shown), or may be an input/output library used by a user application (not shown). Described below is a representative example in which the file system program or input/output library 112 is a file system program. The file system program or input/output library 112 in the following description will therefore be referred to as simply as "file system program 112". However, the following description applies to a case where the file system program or input/output library 112 is an input/output library.

The file system program 112 of this embodiment contains LU set selection hint information 141, sub-data update information 142, and a sub-data update information management module 143 details of which will be described later.

The storage management program 113 executes processing for managing the storage system 102. The storage management program 113 may be provided as part of the OS.

The memory 162 may further store a user application program (not shown) which provides an arbitrary function to the user.

The I/F 163 is an interface that is coupled to the LAN 105 to communicate with the SVP 103 over the LAN 105.

The I/F 164 is an interface that is coupled to the SAN 104 to communicate with the storage system 102 over the SAN 104.

The storage system 102 stores data written by the host computer 101. The storage system 102 holds at least an LU-LU synchronization program 151. The detailed configuration of the storage system 102 will be described later with reference to FIG. 2.

The SVP 103 is a computer for managing the storage system 102. The SVP 103 may have a CPU (not shown), a memory (not shown), and interfaces (not shown), which are coupled to one another. The interfaces are coupled to the LAN 105 and the LAN 106.

In this embodiment, the LANs 105 and 106 employ the Internet Protocol (IP) and the SAN 104 employs the Fibre Channel (FC) protocol. However, those networks can employ any other protocols than the ones described above. In the case where the networks employ other protocols than the above, the I/F 163 and the I/F 164 are replaced with interfaces that are suitable for the protocols employed by their respective coupled networks.

Figure 2:
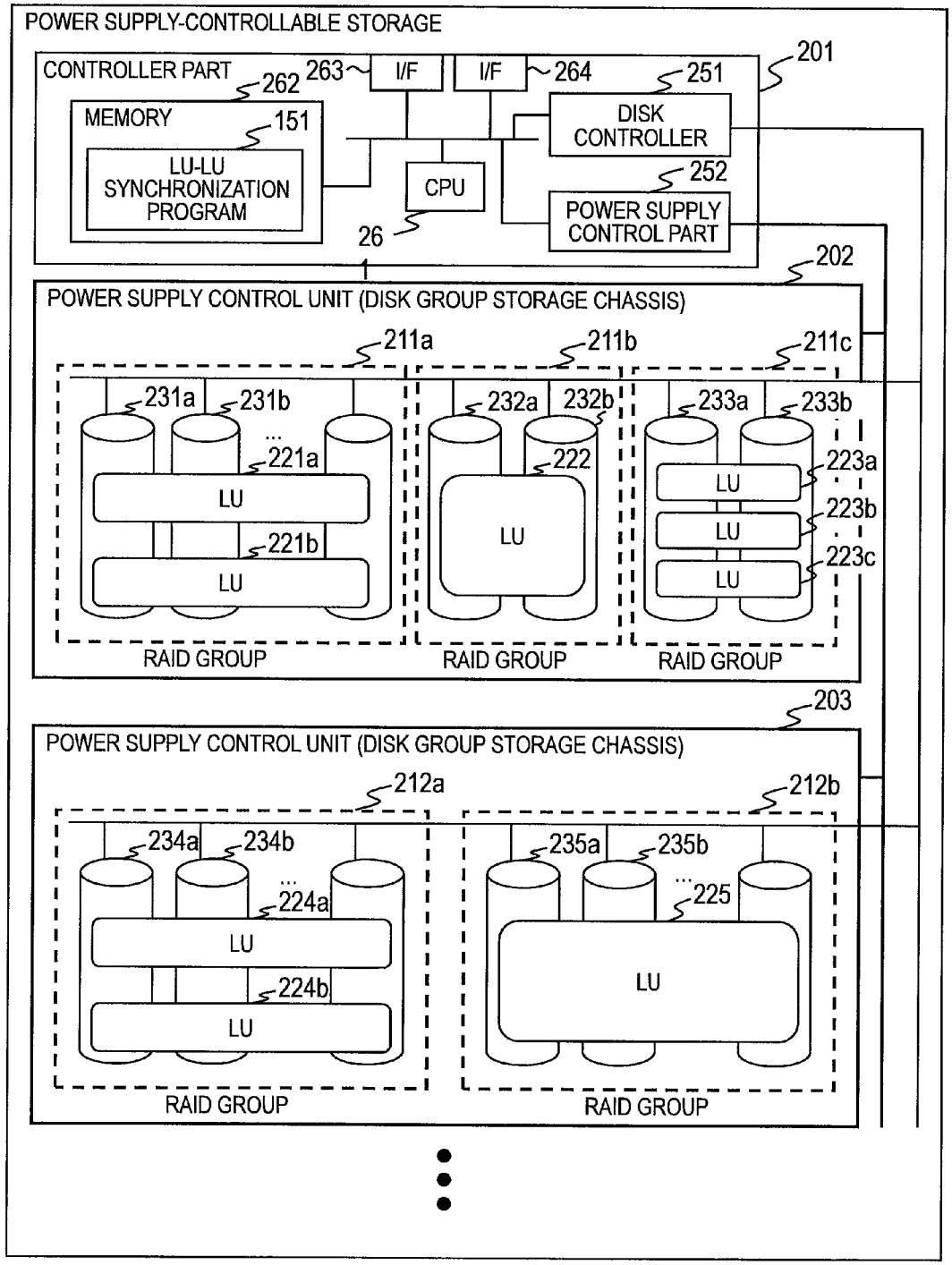
FIG. 2 is a block diagram showing a configuration of a storage system according to the embodiment of this invention.

FIG. 2 is a block diagram showing a configuration of the storage system 102 according to the embodiment of this invention.

The storage system 102 of this embodiment has a controller part 201 and a plurality of hard disk drives (HDDs) 231 (231*a*, 231*b* . . . ), 232 (232*a*, 232*b* . . . ), 233 (233*a*, 233*b* . . . ), 234 (234*a*, 234*b* . . . ), 235 (235*a*, 235*b* . . . ) . . . .

The plurality of HDDs 231, 232, 233, 234, 235 . . . constitute redundant arrays of inexpensive disks (RAID). A RAID group (denoted by 211*a*, 211*b*, 211*c* . . . 212*a*, 212*b* . . . ) is a management unit of the plurality of HDDs 231, 232, 233, 234, 235 . . . constituting RAID. To give a specific example, when the RAID level 1 is implemented by two HDDs out of the HDDs 231, 232, 233, 234, 235 . . . , two mirrored HDDs constitute one RAID group. To give another example, when the RAID level 5 (3D (data)+1P (parity)) is implemented by four HDDs out of the HDDs 231, 232, 233, 234, 235 . . . , four HDDs in which the data and the parity generated from the data are stored constitute one RAID group.

In the example of FIG. 2, the HDDs 231*a*, 231*b* . . . constitute the RAID group 211*a*. The HDDs 232*a* and 232*b* constitute the RAID group 211*b*. The HDDs 233*a* and 233*b* constitute the RAID group 211*c*. The HDDs 234*a*, 234*b* . . . constitute the RAID group 212*a*. The HDDs 235*a*, 235*b* . . . constitute the RAID group 212*b*.

Storage areas of HDDs within the respective RAID groups are provided as arbitrarily sized LUs to the host computer 101. The host computer 101 recognizes each LU as a single storage device. In the example of FIG. 2, LUs 221*a* and 221*b* are set in the RAID group 211*a*. An LU 222 is set in the RAID group 211*b*. LUs 223*a*, 223*b*, and 223*c* are set in the RAID group 211*c*. LUs 224*a* and 224*b* are set in the RAID group 212*a*. An LU 225 is set in the RAID group 212*b*.

The controller part 201 controls data write to and data read from the plurality of HDDs 231, 232, 233, 234, 235 . . . . The controller part 201 is also capable of controlling power on/power off of at least some of the plurality of HDDs 231, 232, 233, 234, 235 . . . . Here, powering on an HDD means at least starting the spinning of the disks in the HDD, and powering off means at least stopping the spinning of the disks in the HDD.

The controller part 201 of this embodiment has a CPU 261, a memory 262, an I/F 263, an I/F 264, a disk controller 251, and a power supply control part 252, which are coupled to one another.

The configuration of the controller part 201 shown in FIG. 2 is merely an example, and this embodiment can be carried out with a controller part that is configured differently from FIG. 2. For instance, the power supply control part 252 may be coupled under the disk controller 251 (i.e., on the HDD side).

The CPU 261 is a processor that executes programs stored in the memory 262.

The memory 262 is a storage device that stores programs executed by the CPU 261, data referred to by the CPU 261, and others. The memory 262 of this embodiment stores at least the LU-LU synchronization program 151.

The I/F 263 and the I/F 264 are coupled to the SAN 104 and the LAN 106 to communicate with the host computer 101 and the SVP 103, respectively.

The disk controller 251 is coupled to the HDDs 231, 232, 233, 234, 235 . . . with the use of, for example, FC to control data write to the HDDs 231, 232, 233, 234, 235 . . . and data read from the HDDs 231, 232, 233, 234, 235 . . . .

The power supply control part 252 controls power on/power off of the HDDs 231, 232, 233, 234, 235 . . . . The power supply control part 252 of this embodiment is coupled to each power supply control unit constituted of a given number of HDDs out of the HDDs 231, 232, 233, 234, 235 . . . , and hence power on/power off can be controlled on a power supply control unit basis.

One power supply control unit can contain an arbitrary number of HDDs. For example, the plurality of HDDs 231, 232, 233, 234, 235 . . . are housed in a plurality of chassis, and HDDs in one chassis may constitute one power supply control unit. In the example of FIG. 2, the RAID groups 211*a*, 211*b*, and 211*c* constitute a power supply control unit 202, and the RAID groups 212*a* and 212*b* constitute a power supply control unit 203. The numbers of RAID groups constituting the respective power supply control units are not limited to the above example, and one RAID group may constitute one power supply control unit, for example.

While FIG. 2 shows two power supply control units 202 and 203, the storage system 102 can have as many power supply control units as desired. At least one of a plurality of power supply control units may be prohibited from turning its power off. For instance, powering off a power supply control unit containing an HDD that stores information necessary to manage the storage system 102 may be prohibited.

The storage system 102 contains nine LUs as shown in FIG. 2, but may have an arbitrary number of LUs.

Figure 3:
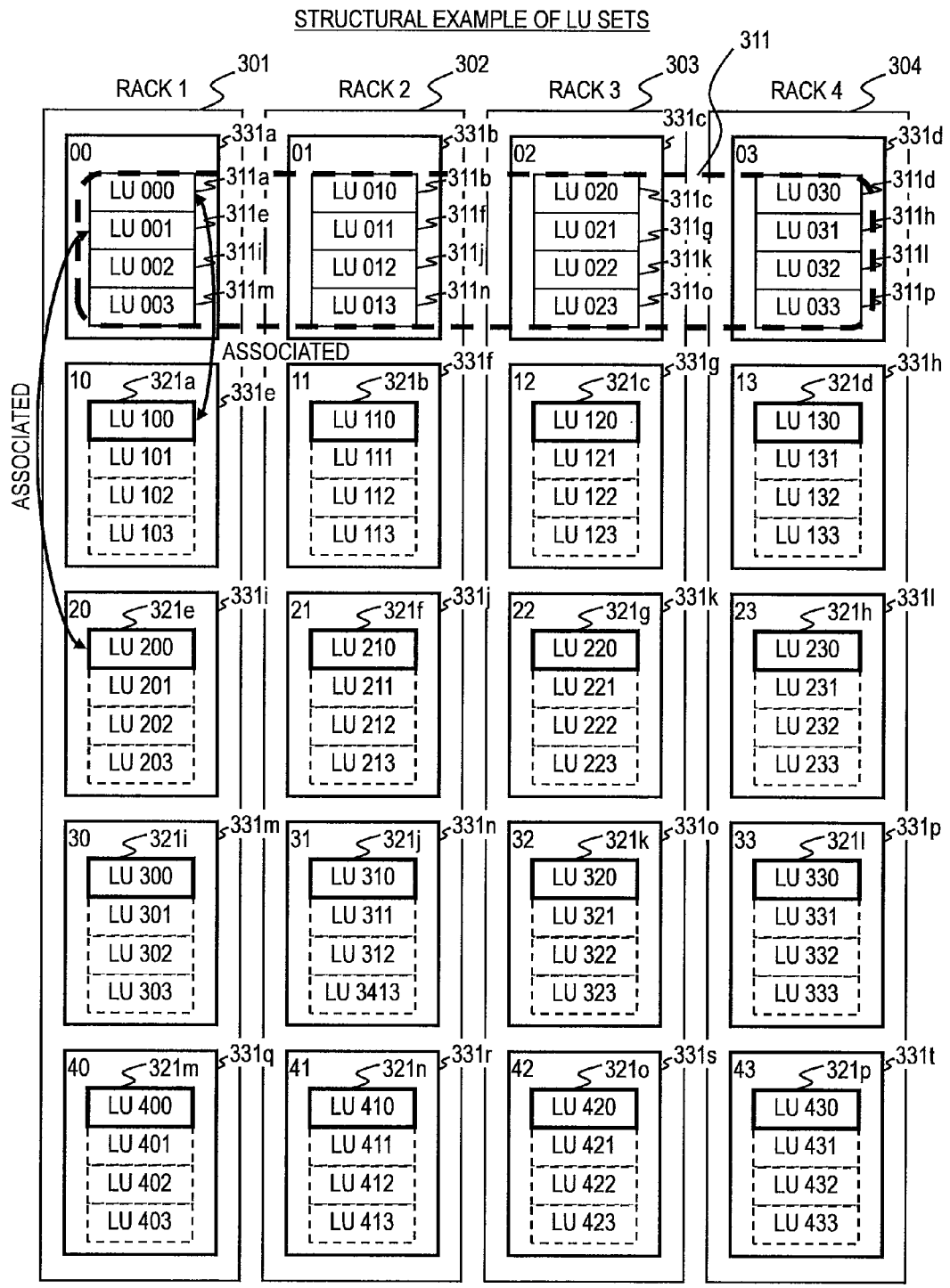
FIG. 3 is a block diagram showing structures of LU sets according to the embodiment of this invention.

FIG. 3 is a block diagram showing structures of LU sets according to the embodiment of this invention.

In this embodiment, a plurality of LUs constitute one LU set. Data is striped among the plurality of LUs contained in one LU set to improve the access performance (specifically, I/O throughput). In the example of FIG. 3, sixteen LUs constitute one LU set, and data contained in one file is stored dispersedly in sixteen LUs at maximum.

Further, two LU sets are associated with each other in this embodiment. Two associated LU sets store in principle the same data. However, as will be described later, data stored in two associated LU sets do not match after data stored in one of the LU sets is updated until data synchronization processing is executed.

The storage system 102 in the example of FIG. 3 has four racks, a rack 1 301 to a rack 4 304. Each rack holds five chassis. Specifically, the rack 1 301 holds a chassis 00 331*a*, a chassis 10 331*e*, a chassis 20 331*i*, a chassis 30 331*m*, and a chassis 40 331*q*. This embodiment treats those chassis as power supply control units equivalent to the power supply control units 202 and 203 shown in FIG. 2. The number "00" affixed to the chassis 00 331*a* of FIG. 3, for example, is an identifier of this chassis. The same applies to the numbers affixed to the rest of the chassis.

Similarly, the rack 2 302 is provided with a chassis 01 331*b*, a chassis 11 331*f*, a chassis 21 331*j*, a chassis 31 331*n*, and a chassis 41 331*r*. The rack 3 303 is provided with a chassis 02 331*c*, a chassis 12 331*g*, a chassis 22 331*k*, a chassis 32 331*o*, and a chassis 42 331*s*. The rack 4 304 is provided with a chassis 03 331*d*, a chassis 13 331*h*, a chassis 23 331*l*, a chassis 33 331*p*, and a chassis 43 33 1*t*.

The chassis 00 331*a* includes four LUs, in other words, an LU 000 311*a*, an LU 001 311*e*, an LU 002 311*i*, and an LU 003 311*m*. Each LU is identical to an LU 221*a* of FIG. 2. For example, the number "000" affixed to the LU 000 311*a* of FIG. 3 is the identifier of that LU. Numbers affixed to other LUs are the same.

Similarly, the chassis 01 331*b* includes an LU 010 311*b*, an LU 011 311*f*, an LU 012 311*j*, and an LU 013 311*n*. The chassis 02 331*c* includes an LU 020 311*c*, an LU 021 311*g*, an LU 022 311*k*, and an LU 023 311*o*. The chassis 03 331*d* includes an LU 030 311*d*, an LU 031 311*h*, an LU 032 311*l*, and an LU 033 311*p*.

In the example of FIG. 3, the sixteen LUs, the LU 000 311*a* to the LU 033 311*p*, constitute a first LU set 311.

The chassis 10 331*e* includes at least an LU 100 321*a*. Similarly, the chassis 20 331*i*, the chassis 30 331*m*, the chassis 40 331*q*, the chassis 11 331*f*, the chassis 21 331*j*, the chassis 31 331*n*, the chassis 41 331*r*, the chassis 12 331*g*, the chassis 22 331*k*, the chassis 32 331*o*, the chassis 42 331*s*, the chassis 13 331*h*, the chassis 23 331*l*, the chassis 33 331*p*, and the chassis 43 331*t* respectively include at least an LU 200 321*e*, an LU 300 321*i*, an LU 400 321*m*, an LU 110 321*b*, an LU 210 3211*f*, an LU 310 321*j*, an LU 410 321*n*, an LU 120 321*c*, an LU 220 321*g*, an LU 320 321*k*, an LU 420 321*o*, an LU 130 321*d*, an LU 230 321*h*, an LU 330 321*l*, and an LU 430 321*p*.

In the example of FIG. 3, the sixteen LUs, the LU 100 321*a* to the LU 430 321*t*, constitute a second LU set. In the following description, the second LU set is described as an LU set 321.

The LU set 321 corresponds to the LU set 311. Specifically, the LU 000 311*a*, the LU 001 311*e*, the LU 002 311*i*, the LU 003 311*m*, the LU 010 311*b*, the LU 011 311*f*, the LU 012 311*j*, the LU 013 311*n*, the LU 020 311*c*, the LU 021 311*g*, the LU 022 311*k*, the LU 023 311*o*, the LU 030 311*d*, the LU 031 311*h*, the LU 032 311*l*, and the LU 033 311*p* respectively correspond to the LU 100 321*a*, the LU 200 321*e*, the LU 300 321*i*, the LU 400 321*m*, the LU 110 321*b*, the LU 210 3211*f*, the LU 310 321*j*, the LU 410 321*n*, the LU 120 321*c*, the LU 220 321*g*, the LU 320 321*k*, the LU 420 321*o*, the LU 130 321*d*, the LU 230 321*h*, the LU 330 321*l*, and the LU 430 321*p*.

As described above, the sixteen LUs belonging to the LU set 311 are allocated dispersedly to four chassis. On the other hand, the sixteen LUs belonging to the LU set 321 are allocated dispersedly to sixteen chassis. In the case where each chassis holds an equal number of HDDs, the sixteen LUs belonging to the LU set 321 are dispersed among more HDDs than the sixteen LUs belonging to the LU set 311 are.

For example, to save data of some file to the LU set 311, the data is stored dispersedly in the sixteen LUs contained in the LU set 311. When processing of synchronizing the LU set 311 and the LU set 321 with each other is executed subsequently, the data stored in the sixteen LUs of the LU set 311 is copied to the sixteen LUs of the LU set 321 on a one-on-one basis. As a result, data of the same file is stored in the two LU sets.

Storing data of one file dispersedly in a plurality of LUs improves the performance in accessing the file. This is because a plurality of LUs (more strictly, a plurality of HDDs to which the plurality of LUs are allocated) are accessed concurrently. However, in the case where the plurality of LUs physically share one HDD, access to the HDD is executed sequentially, and hence the access performance is not improved.

In the example of FIG. 3, the LU 000 311*a*, the LU 001 311*e*, the LU 002 311*i*, and the LU 003 311*m* out of the sixteen LUs constituting the LU set 311 are allocated to the same chassis 00 331*a*. In other words, there is a possibility that those four LUs share an HDD. In particular, when the chassis 00 331*a* contains only one RAID group, those four LUs share an HDD without exception. The improvement in access performance cannot be expected from dispersing data among those four LUs. The same applies to LUs contained in the chassis 01 331*b*, the chassis 02 331*c*, and the chassis 03 331*d*.

On the other hand, the sixteen LUs constituting the LU set 321 are all allocated to different chassis. Accordingly, data of a file stored in the LU set 321 is accessed at an improved access performance level by concurrent access to the sixteen LUs.

However, access to data stored in the LU set 321 requires powering on HDDs in sixteen chassis whereas access to data stored in the LU set 311 requires powering on HDDs in four chassis. This means that accessing data in the LU set 321 consumes more power than when data in the LU set 311 is accessed.

In the case where the LU set 311 and the LU set 321 store the same data as described above, one of the LU set 311 and the LU set 321 is chosen to be accessed based on the required access performance and power consumption. When reducing power consumption is given priority over high access performance, the LU set 311 is chosen to be accessed whereas the LU set 321 is chosen when high access performance is given priority over reducing power consumption.

One of LUs may store data necessary to manage the storage system 102. This data may be made available for access at any time by prohibiting powering off a chassis that stores the data. In this case, LUs that are used when the reduction of power consumption is given priority may be stored in the chassis that is prohibited from being powered off. This prevents an increase in number of chassis that are powered on. In the example of FIG. 3, the chassis 00 331*a* to the chassis 03 331*d* may be prohibited from being powered off.

Next, a method of enabling the host computer 101 to access chosen one of two LU sets will be described with reference to FIG. 4 and FIGS. 23 to 26.

Figure 4:
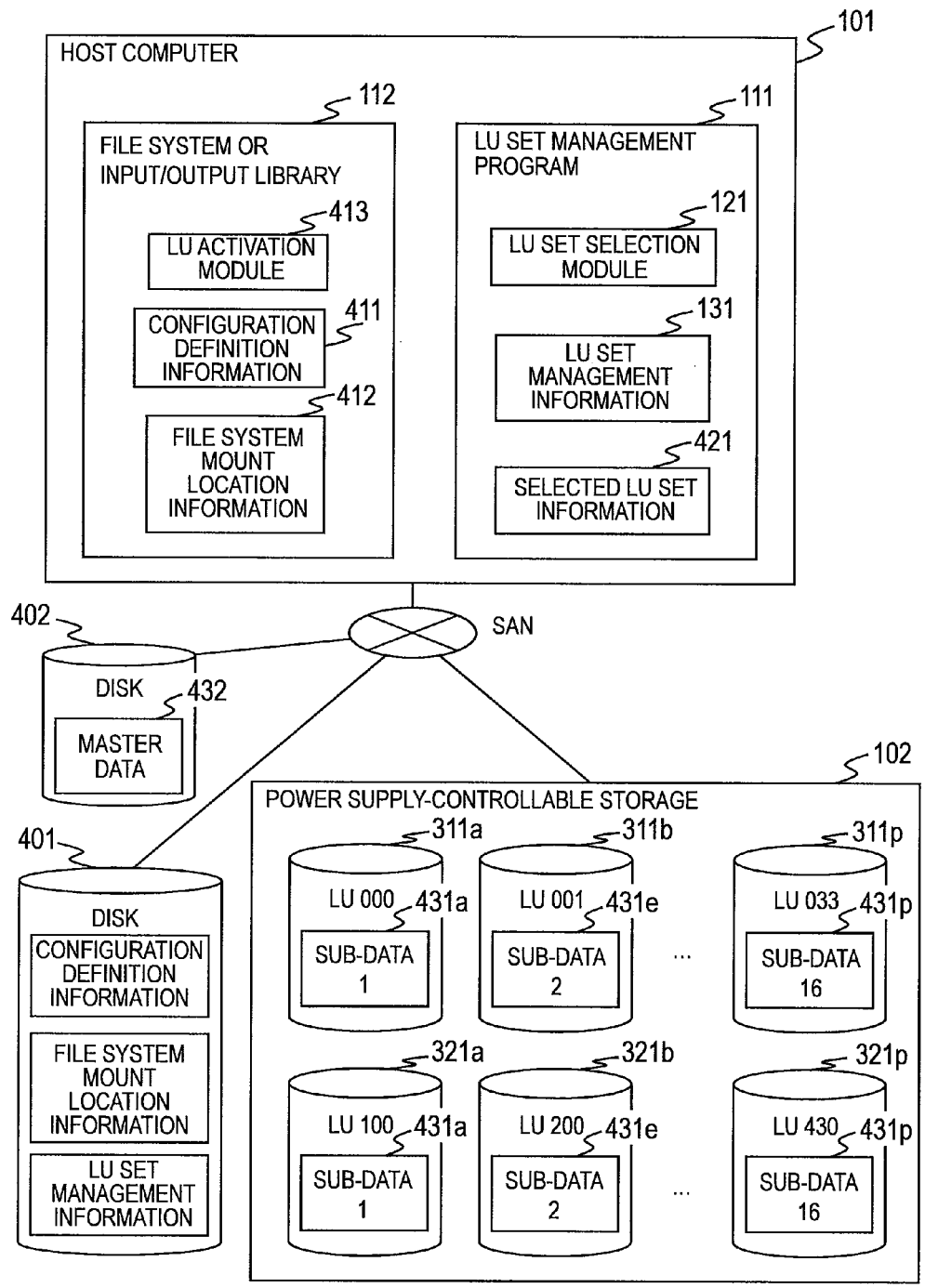
FIG. 4 is an explanatory diagram of a configuration of a logically single file storage space according to the embodiment of this invention.

FIG. 4 is an explanatory diagram of a configuration of a logically single file storage space according to the embodiment of this invention.

Of the components of the computer system shown in FIG. 1, ones that are not necessary for the description of the logically single file storage space are omitted from FIG. 4.

The file system program 112 contains, in addition to the modules and information shown in FIG. 1, an LU activation module 413, configuration definition information 411, and file system mount location information 412. The LU set management program 111 contains, in addition to the modules and information shown in FIG. 1, selected LU set information 421. Those additional module and information will be described later in detail.

A disk 401 stores information equivalent to the configuration definition information 411, the file system mount location information 412, and the LU set management information 131.

The disk 401 can be implemented by any physical storage device or logical storage area. For example, the disk 401 may be any one of the HDDs 231, 232, 233, 234, 235 . . . contained in the storage system 102, may be any one of the LUs 221 (221a, 221b), 222, 223 (223a, 223b, 223c), 224 (224a, 224b), 225 . . . , or may be a storage device that is coupled to the SAN 104 independently of the storage system 102. However, the LU set management program 111 needs to be prohibited from controlling the power on/power off of the disk 401. In other words, the LU set management program 111 is not allowed to power off the disk 401.

Sub-data 1 431a to sub-data 16 431p shown in FIG. 4 are each a dispersed file storage space. Those sixteen pieces of sub-data are respectively associated with one of the storage areas of sixteen LUs that are contained in the LU set 311, namely, the LU 000 311a to the LU 033 311p, and the storage areas of sixteen LUs that are contained in the LU set 321, namely, the LU 100 321a to the LU 430 321p.

FIG. 4 shows, for the sake of convenience, a state in which the sub-data 1 431a is associated with the LU 000 311a and with the LU 100 321a both. Actually, the sub-data 1 431a is under no circumstances associated with the LU 000 311a and the LU 100 321a both at the same time, but is associated with chosen one of the two LUs.

When the sub-data 1 431a is associated with the LU 000 311a, the sub-data 2 431b to the sub-data 16 431p are associated with the LU 001 311e to the LU 033 311p, respectively. When the sub-data 1 431a is associated with the LU 100 321a, the sub-data 2 431b to the sub-data 16 431p are associated with the LU 201 321e to the LU 430 321p, respectively. Those sixteen pieces of sub-data are together treated as a logically single file storage space.

"1" to "16" affixed to the sub-data 1 431a to the sub-data 16 431p of FIG. 4 are information for identifying the respective pieces of sub-data. This information is referred to as sub-data labels in FIGS. 24 and 25.

Master data 432 shown in FIG. 4 is stored in a disk 402. The master data 432 holds information with which partial files stored in sixteen pieces of sub-data are treated as one logical file when sixteen pieces of sub-data are treated as a logically single file storage space. The master data 432 holds, for example, the name of a logical file and information for managing a plurality of logical files in a tree structure.

As is the disk 401, the disk 402 can also be implemented by any physical storage device or logical storage area. The disk 402 is also similar to the disk 401 in that the LU set management program 111 is not allowed to power off the disk 402.

While FIG. 4 shows the disk 401 and the disk 402, the disks 401 and 402 may be implemented by a single disk by, for example, adding the master data 432 to the disk 401 and omitting the disk 402.

Figure 23:
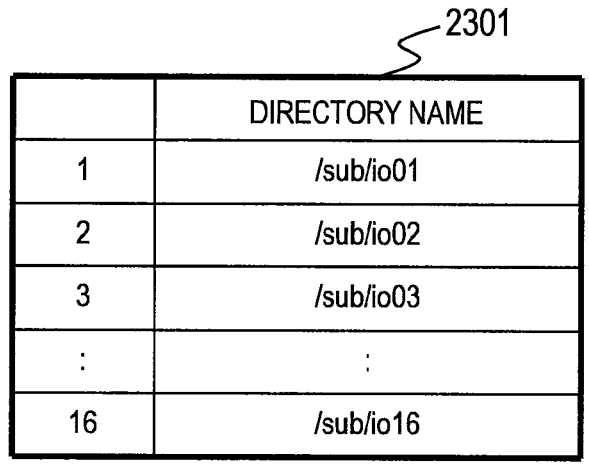
FIG. 23 is an explanatory diagram of configuration definition information according to the embodiment of this invention.

FIG. 23 is an explanatory diagram of the configuration definition information 411 according to the embodiment of this invention.

The configuration definition information 411 contains a directory name 2301. The directory name 2301 is a list of directory names for identifying directories to which LUs associated with the respective pieces of sub-data are mounted (namely, mount points). The information held in the configuration definition information 411 does not need to be directory names themselves, and can be any kind of information as long as directory names can be generated from the information.

The configuration definition information 411 may further contain information necessary for striping (e.g., information indicating the striping size).

Figure 24:
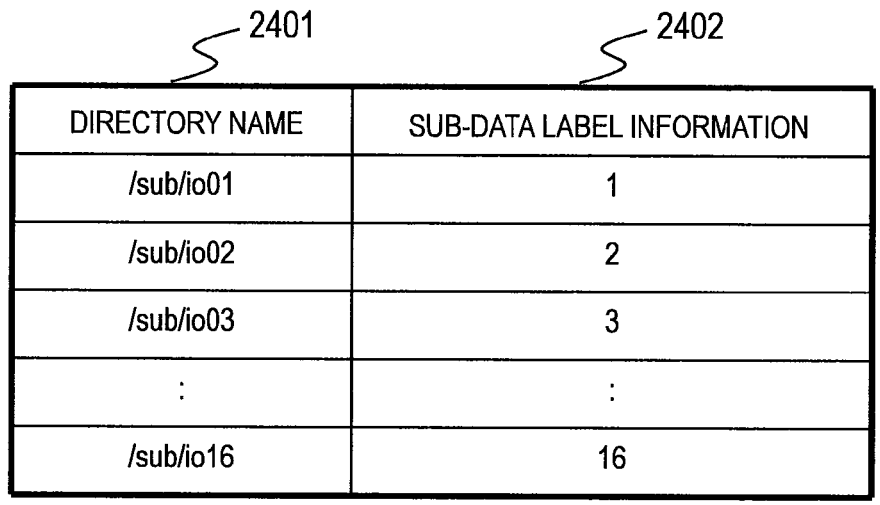
FIG. 24 is an explanatory diagram of file system mount location information according to the embodiment of this invention.

FIG. 24 is an explanatory diagram of the file system mount location information 412 according to the embodiment of this invention.

The file system mount location information 412 contains a directory name 2401 and sub-data label information 2402.

The sub-data label information 2402 is information for identifying each piece of sub-data.

The directory name 2401 is a directory name for identifying a directory to which an LU associated with a piece of sub-data is to be mounted.

In the example of FIG. 24, "1" is registered as the sub-data label information 2402 in association with a value "/sub/io01" of the directory name 2401. This indicates that any one of the LU 000 311a and the LU 100 321a which are associated with the sub-data 1 431a identified by a sub-data label "1" is mounted to a mount point "/sub/io01". Which of the LU 000 311a and the LU 100 321a is to be mounted is determined based on the selected LU set information 421, which will be described next.

Figure 25:
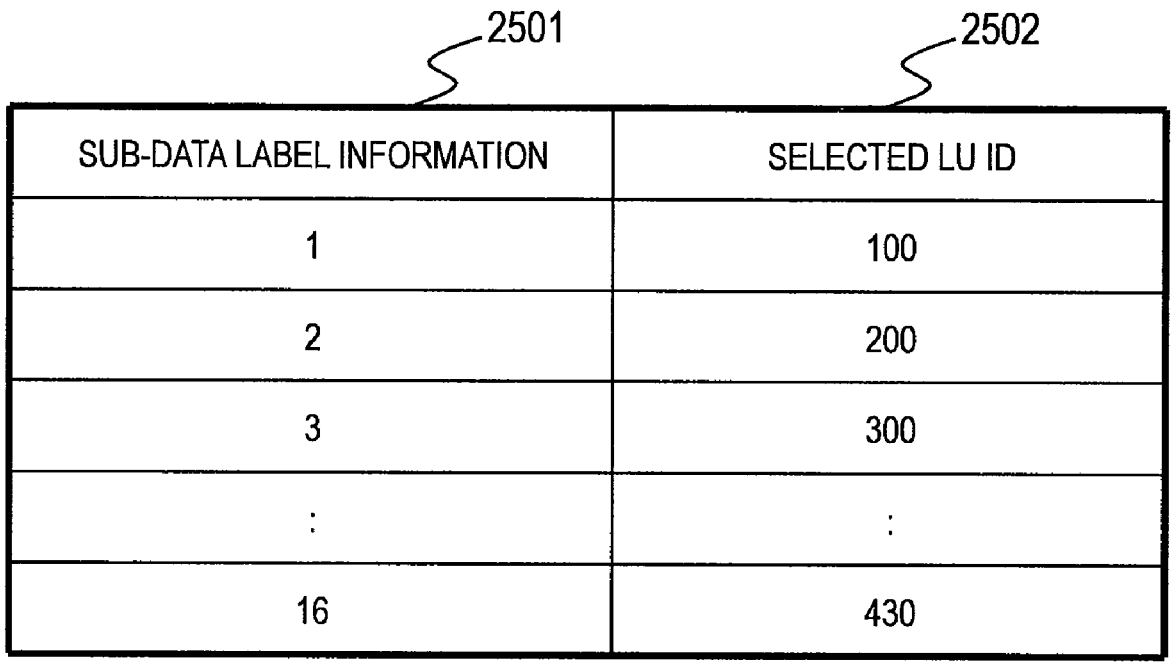
FIG. 25 is an explanatory diagram of selected LU set information according to the embodiment of this invention.

FIG. 25 is an explanatory diagram of the selected LU set information 421 according to the embodiment of this invention.

The selected LU set information 421 contains sub-data label information 2501 and a selected LU ID 2502.

The sub-data label information 2501 is information for identifying each piece of sub-data, as is the sub-data label information 2402.

The selected LU ID 2502 is information for identifying an LU that is associated with sub-data identified by the sub-data label information 2501. The selected LU ID 2502 can be any kind of information as long as an LU can be identified uniquely. For example, the selected LU ID 2502 may be a device file name, a universally unique identifier (UUID), or a label name.

FIG. 25 shows an example in which the LU set 321 is chosen to be accessed. In this example, "100" is registered as the selected LUID 2502 in association with the value "1" of the sub-data label information 2501. This indicates that, out of the LU 000 311a and the LU 100 321a, the LU 100 321a is chosen as an LU that is associated with the sub-data 1 431a.

The LU set selection is executed by the LU set selection module 121 as will be described later with reference to FIGS. 10, 11, and 22.

Figure 26:
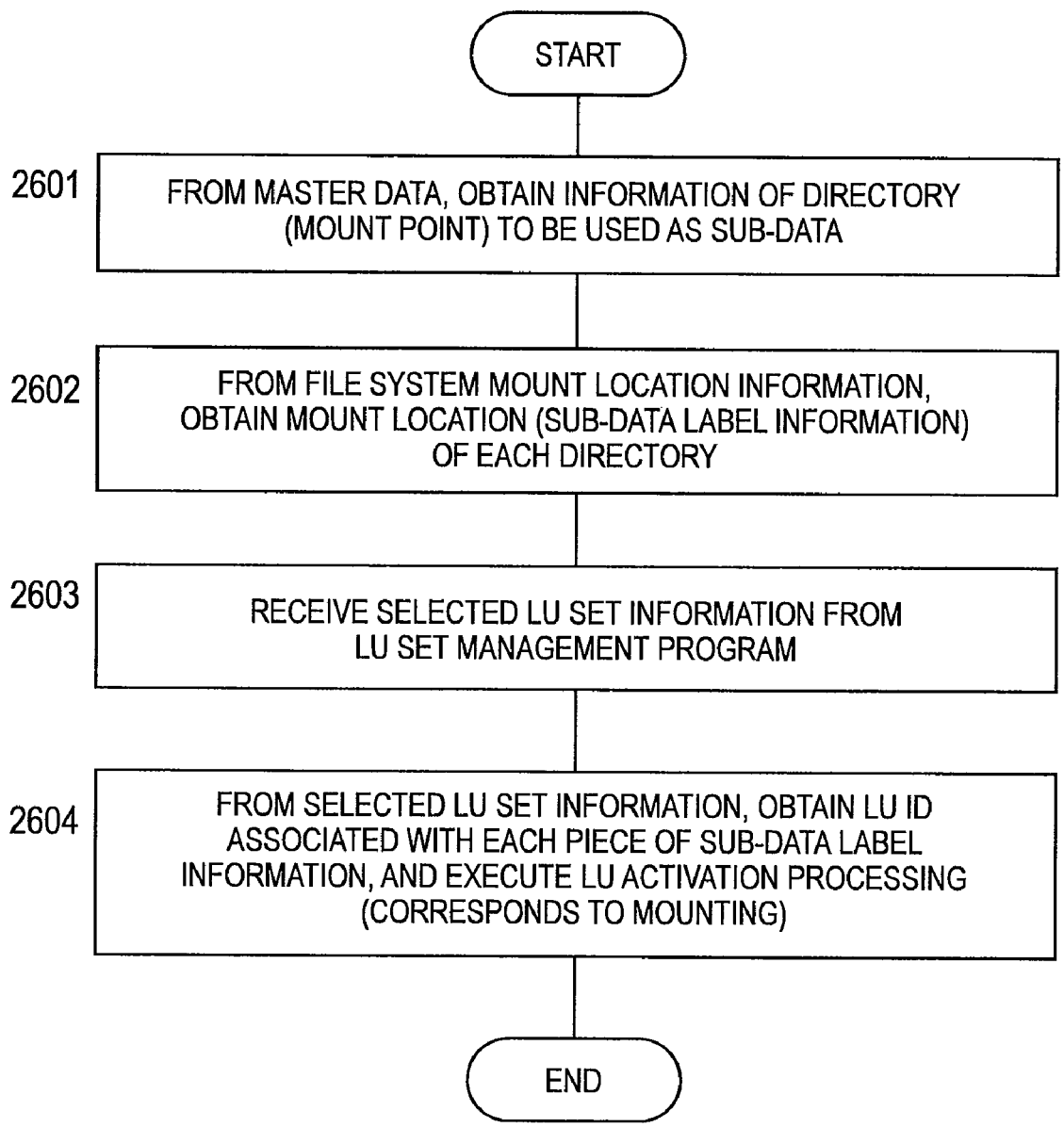
FIG. 26 is a flow chart showing processing that is executed by an LU activation module according to the embodiment of this invention.

FIG. 26 is a flow chart showing processing that is executed by the LU activation module 413 according to the embodiment of this invention.

First, the LU activation module 413 refers to the configuration definition information 411 to obtain the directory name 2301 (i.e., information indicating the mount point) of a directory used as sub-data (Step 2601).

Next, the LU activation module 413 refers to the file system mount location information 412 to obtain information that indicates the mount location of each directory (i.e., the sub-data label information 2402) (Step 2602).

Then, the LU activation module 413 receives the selected LU set information 421 from the LU set management program 111 (Step 2603).

From the information received in Step 2603, the LU activation module 413 obtains the selected LU ID 2502 that is associated with each piece of the sub-data label information 2501, and executes mounting (Step 2604). Specifically, the LU activation module 413 looks up the sub-data label information 2501 registered in association with the selected LU ID 2502, searches for the sub-data label information 2402 that matches the sub-data label information 2501, obtains the directory name 2401 that is associated with the found sub-data label information 2402, and mounts an LU that is identified by the selected LU ID 2502 to a directory that is identified by the obtained directory name 2401.

An LU is activated through the above processing.

For example, in the case where the selected LU ID 2502 contained in the information received in Step 2603 identifies an LU within the LU set 321 as shown in FIG. 25, each LU contained in the LU set 321 is mounted to a directory identified by the directory name 2301 through the processing of FIG. 26. Mounted to directories, LUs contained in the LU set 321 are thus activated.

As described above, the LU set 311 and its associated LU set 321 store data of the same file. When the file system program 112 receives a request to access the file after each LU contained in the LU set 321 is activated in the manner described above, the file system program 112 executes access to the LUs contained in the selected LU set 321.

Specifically, to process a request to write a file, the file system program 112 stores data of the single file dispersedly in sixteen LUs contained in the selected LU set 321. To process a request to read a file, the file system program 112 reads data of the single file stored dispersedly in sixteen LUs contained in the selected LU set 321. The write and the read are accomplished through processing shown in FIGS. 27 and 28.

In the case where the LU set 311 is chosen to be accessed, values of the selected LU IDs 2502 that are associated with values "1" to "16" of the sub-data label information 2501 of FIG. 25 are the identifiers of the LUs contained in the LU set 311, namely, "000" to "033". In this case, the processing of FIG. 26 activates the LUs within the LU set 311 and then access to those LUs is executed.

Figure 27:
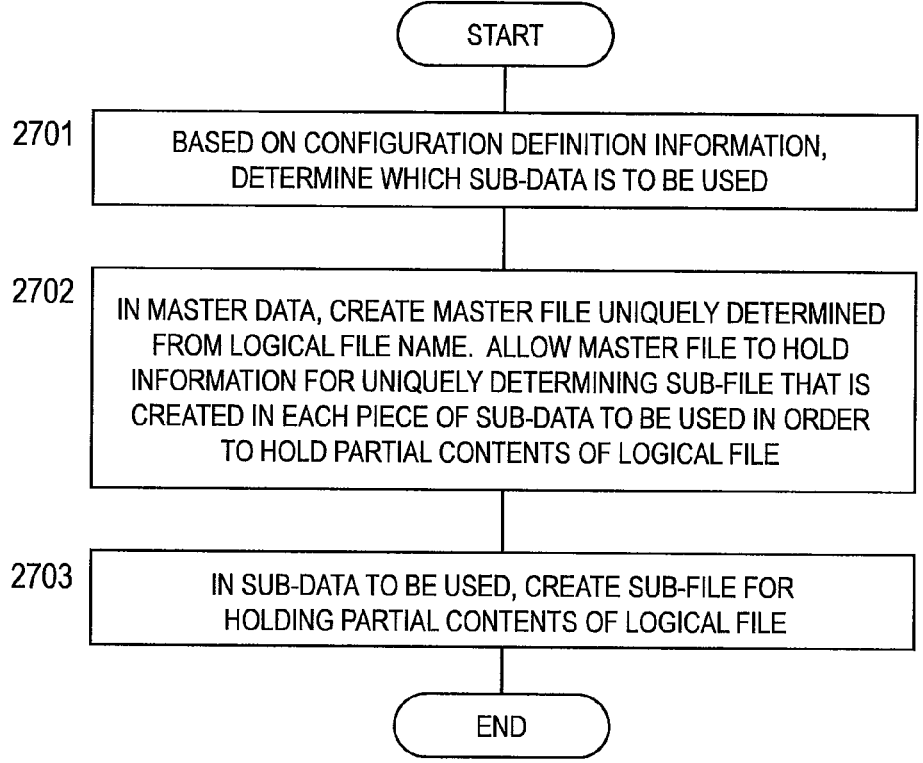
FIG. 27 is a flow chart showing logical file creating processing, which is executed by a file system program according to the embodiment of this invention.

FIG. 27 is a flow chart showing logical file creating processing, which is executed by the file system program 112 according to the embodiment of this invention.

The processing of FIG. 27 is executed by a logical file creation module (not shown) within the file system program 112.

First, the logical file creation module determines based on the configuration definition information 411 which sub-data is to be used (Step 2701).

Next, the logical file creation module creates a master file (not shown) in the master data 432 (Step 2702). A master file is determined uniquely from the name of a logical file. The master file contains information for uniquely determining a sub-file (not shown) created in each piece of sub-data to be used in order to hold partial contents of the logical file.

Next, the logical file creation module creates sub-files for holding partial contents of the logical file in the sub-data to be used (Step 2703).

Figure 28:
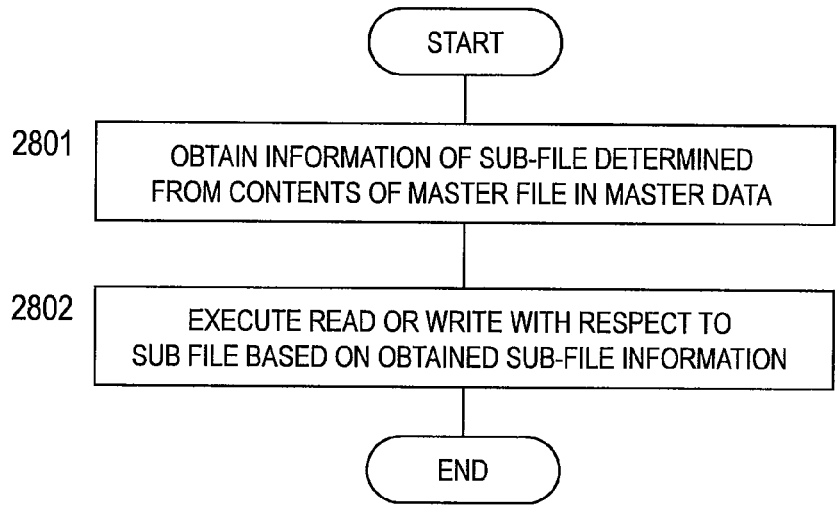
FIG. 28 is a flow chart showing logical file input/output processing, which is executed by the file system program according to the embodiment of this invention.

FIG. 28 is a flow chart showing logical file input/output processing, which is executed by the file system program 112 according to the embodiment of this invention.

The processing of FIG. 28 is executed by a logical file input/output module (not shown) within the file system program 112.

First, the logical file input/output module obtains information of a sub-file determined from the contents of a master file in the master data 432 (Step 2801).

Next, the logical file input/output module executes read or write with respect to the sub-file based on the obtained sub-file information (Step 2802).

Figure 5:
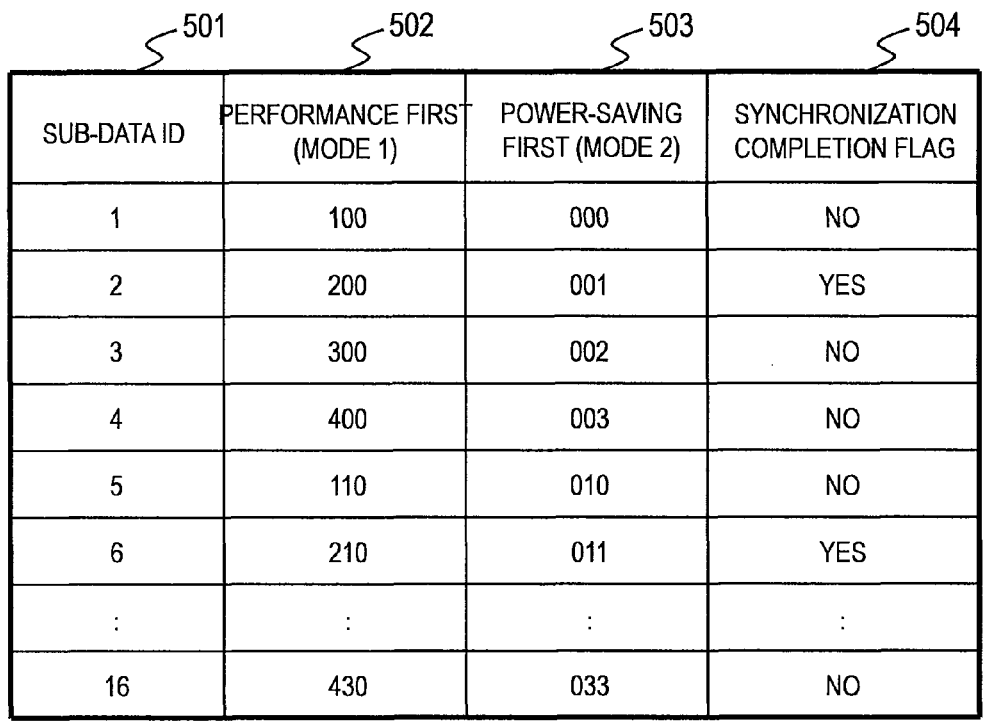
FIG. 5 is an explanatory diagram of LU set management information according to the embodiment of this invention.

FIG. 5 is an explanatory diagram of the LU set management information 131 according to the embodiment of this invention.

The LU set management information 131 contains a sub-data ID 501, a performance-first LU 502, a power-saving-first LU 503, and a synchronization completion flag 504.

The sub-data ID 501 is information for identifying each piece of sub-data similarly to the sub-data label information 2402 and 2501. In the example of FIG. 5, "1" to "16" with which the sixteen pieces of sub-data described with reference to FIG. 4 are identified are registered as the sub-data ID 501.

The performance-first LU 502 indicates the identifier of an LU that is selected in a performance-first mode. The performance-first mode is a mode set when the improvement of the access performance is given priority over the reduction of power consumption. In the following description, the performance-first mode is also referred to as "mode 1". "100" to "430" are registered as the performance-first LU 502 in the example of FIG. 5, with which the LUs contained in the LU set 321 are identified.

The power-saving-first LU 503 indicates the identifier of an LU that is selected in a power-saving-first mode. The power-saving-first mode is a mode set when the reduction of power consumption is given priority over the improvement of the access performance. In the following description, the power-saving-first mode is also referred to as "mode 2". "000" to "033" are registered as the power-saving-first LU 503 in the example of FIG. 5, with which the LUs contained in the LU set 311 are identified.

The synchronization completion flag 504 is a flag indicating whether or not processing of synchronizing two LUs that are associated with one piece of sub-data has been completed. When the processing of synchronizing two LUs that are associated with one piece of sub-data is completed, a value "Yes" is registered as the synchronization completion flag 504 in association with those LUs. Those LUs at this point are storing the same data. In the case where data in only one of the two LUs is updated subsequently, the value of the synchronization completion flag 504 associated with the LUs is updated to "No". Data in the updated LU and data in the other LU differ from each other, at least partially, at this point.

FIG. 6 is an explanatory diagram of the employed mode information 132 according to the embodiment of this invention.

The employed mode information 132 contains information for managing modes set in this embodiment. Specifically, the employed mode information 132 contains a default mode 601, a switch-from-default-mode permission/prohibition 602, a last mode 603, a current mode 604, a switch-from-current-mode permission/prohibition 605, and a temporary mode 606.

The default mode 601 is information indicating a mode that is chosen when no explicit instruction is given about which mode is to be employed (i.e., default mode).

The switch-from-default-mode permission/prohibition 602 is a default value of information that indicates whether or not the user is permitted to switch the currently set mode. As will be described later with reference to FIG. 10, in the case where an option to a mount request does not specify whether mode switching is permitted or prohibited, a value registered as the switch-from-default-mode permission/prohibition 602 determines whether to allow mode switching. In this case, the same value that is registered as the switch-from-default-mode permission/prohibition 602 is registered as the switch-from-current-mode permission/prohibition 605, which will be described later.

The last mode 603 is information indicating a mode that has been set the last time. Specifically, when an LU is unmounted, a value indicating a mode that has been set immediately before the unmounting (in other words, a value that has been registered as the current mode 604 immediately before the unmounting) is registered as the last mode 603. In some cases, synchronization processing described later is executed when an LU unmounted in this manner is mounted again. The last mode 603 is referred to in order to determine which LU is the copy source and which LU is the copy destination in the synchronization processing.

The current mode 604 is information indicating a mode that is currently set.

The switch-from-current-mode permission/prohibition 605 is information indicating whether or not the user is permitted to switch the current mode. When a value of the switch-from-current-mode permission/prohibition 605 is "permitted", the user is allowed to switch the current mode.

The temporary mode 606 is information indicating a mode that replaces the current mode when a switch from the current mode is permitted. For instance, when the power-saving-first mode is set at present and the user is allowed to switch the current mode, "performance-first mode" is registered as the temporary mode 606.

Figure 7:
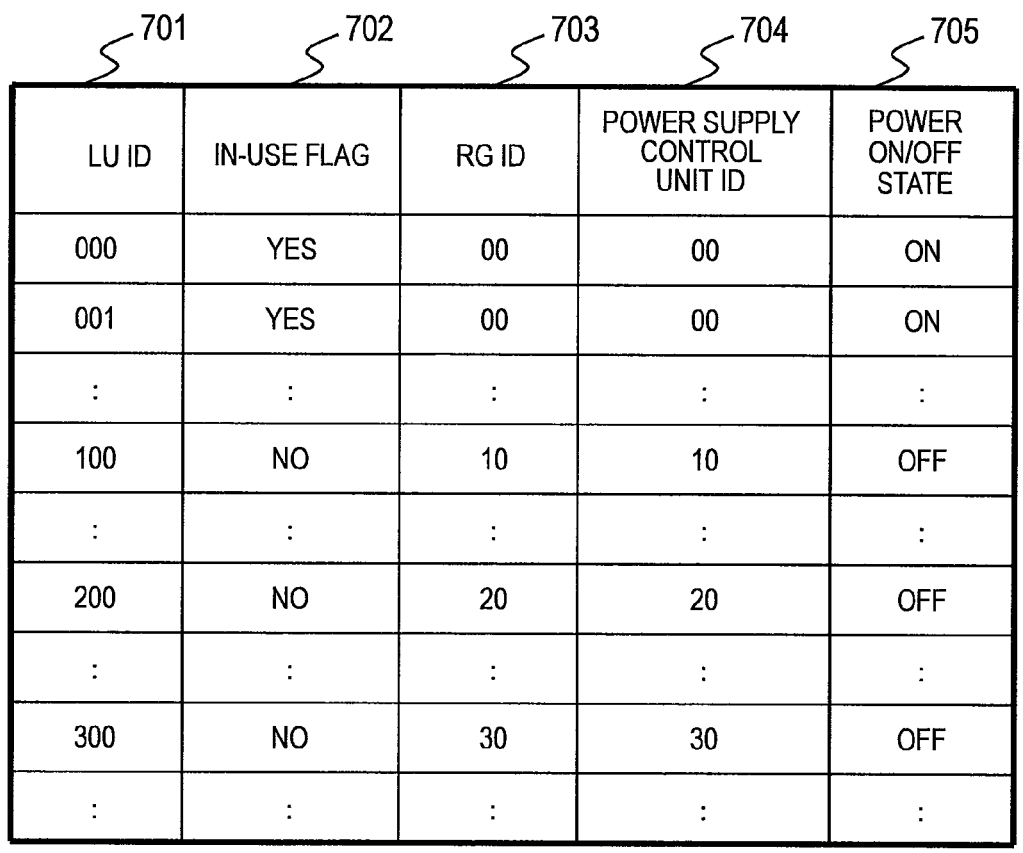
FIG. 7 is an explanatory diagram of power supply control information according to the embodiment of this invention.

FIG. 7 is an explanatory diagram of the power supply control information 133 according to the embodiment of this invention.

The power supply control information 133 contains an LU ID 701, an in-use flag 702, an RG ID 703, a power supply control unit ID 704, and a power on/off state 705.

The LU ID 701 is information for identifying each LU.

The in-use flag 702 is information indicating whether or not an LU is in use, in other words, whether or not an LU is mounted. In the case of an LU that is mounted, "Yes" is registered as the in-use flag 702 in association with this LU.

The RG ID 703 is information for identifying each RAID group (RG) which contains LUs.

The power supply control unit ID 704 is information for identifying each power supply control unit which contains LUs.

The power on/off state 705 is information indicating the power on/off state of each power supply control unit which contains LUs. A value "ON" registered as the power on/off state 705 in association with a power supply control unit indicates that the power of HDDs contained in the power supply control unit is on.

In the example of FIG. 7, in an entry where a value of the LU ID 701 is "000", "Yes", "00", "00", and "ON" are registered as the in-use flag 702, the RG ID 703, the power supply control unit ID 704, and the power on/off state 705, respectively. This indicates that the LU 000 311a, which is identified by "000", is currently mounted and is contained in a RAID group identified by "00", that this RAID group is contained in a power supply control unit identified by "00" (chassis 00 331a), and that the power of HDDs contained in the chassis 00 331a is on.

One power supply control unit may contain a plurality of LUs as shown in FIG. 3. In the case where none of LUs contained in one power supply control unit are in use, this power supply control unit can be powered off. When at least one of the plurality of LUs contained in the power supply control unit is in use, on the other hand, the power supply control unit needs to be powered on despite the rest of the LUs not being in use. Therefore, while the value of the power on/off state 705 is always "ON" when the value of the in-use flag 702 is "Yes", when the value of the in-use flag 702 is "No", the value of the power on/off state 705 is "ON" in some cases and "OFF" in other cases.

Figure 8:
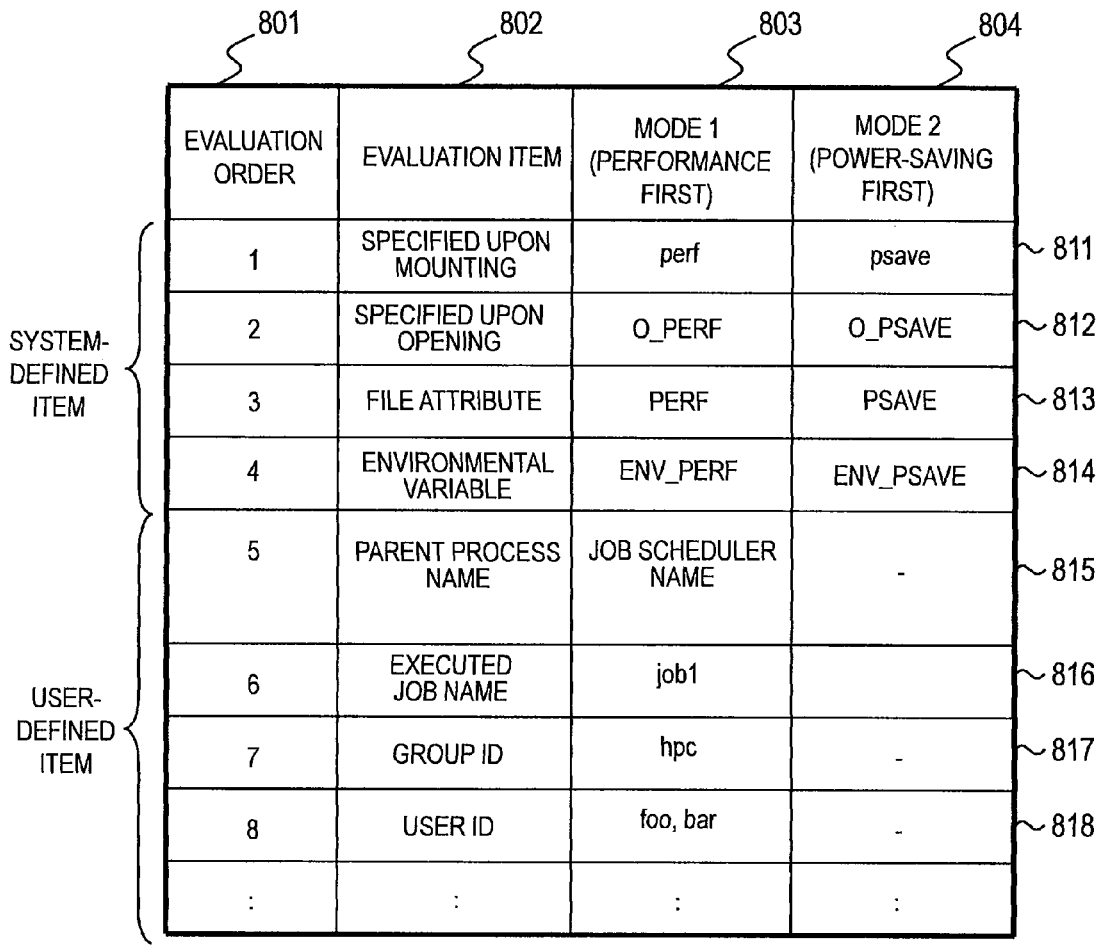
FIG. 8 is an explanatory diagram of LU set switching condition information according to the embodiment of this invention.

FIG. 8 is an explanatory diagram of the LU set switching condition information 134 according to the embodiment of this invention.

The LU set switching condition information 134 contains information for managing conditions based on which whether to switch modes is judged (conditions that provide a basis for judging whether LUs to be mounted). The judging is executed in Step 1001 of FIG. 10 and Step 1203 of FIG. 12 which will be described later.

The LU set switching condition information 134 contains an evaluation order 801, an evaluation item 802, a performance-first condition 803, and a power-saving-first condition 804.

The evaluation order 801 indicates an order in which judging conditions are evaluated.

The evaluation item 802 indicates an item evaluated as a judging condition.

The performance-first condition 803 indicates a condition based on which whether to switch to the performance-first mode is judged. When a condition registered as the performance-first condition 803 is met, a switch to the performance-first mode (in other words, a switch to an LU set that is associated with the performance-first mode) is executed.

The power-saving-first condition 804 indicates a condition based on which whether to switch to the power-saving-first mode is judged. When a condition registered as the power-saving-first condition 804 is met, a switch to the power-saving-first mode (in other words, a switch to an LU set that is associated with the power-saving-first mode) is executed.

In the example of FIG. 8, in an entry where a value of the evaluation order 801 is "1" (entry 811), "specified upon mounting", "perf", and "psave" are registered as the evaluation item 802, the performance-first condition 803, and the power-saving-first condition 804, respectively. In this case, a mode designation contained in a mount request is judged first. Specifically, when "perf" is designated upon mounting (for example, when an option to a mount command or a flag argument of the mount function contains "perf"), the performance-first mode is set, which means that the LUs contained in the LU set 321 are to be mounted. When "psave" is designated upon mounting, on the other hand, the power-saving-first mode is set by mounting LUs that are contained in the LU set 311 as in Steps 1001 and 1003 of FIG. 10.

In the case where none of "perf" and "psave" are designated upon mounting, a mode registered as the default mode 601 in the employed mode information 132 are set.

Figure 12:
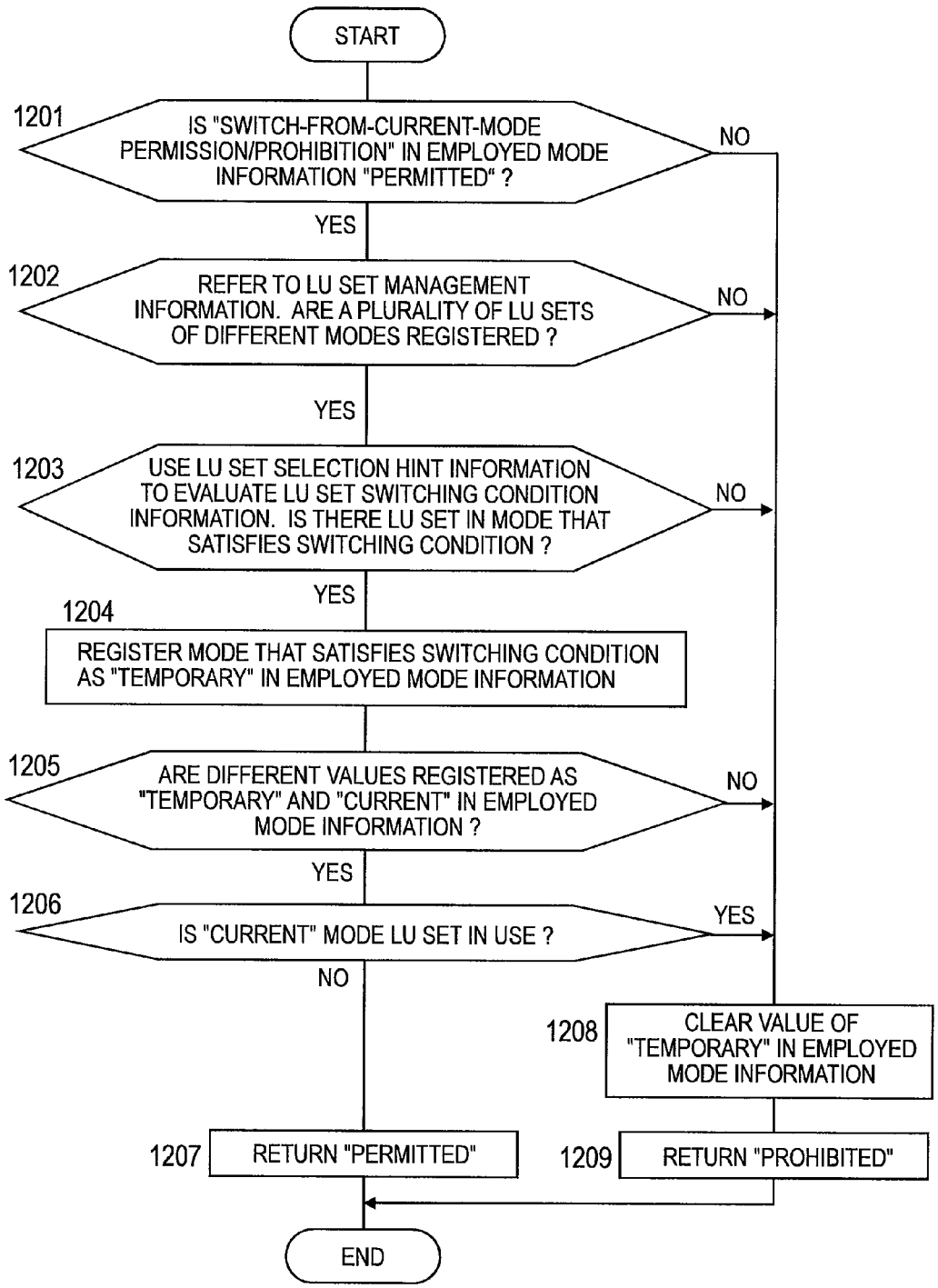
FIG. 12 is a flow chart showing an LU set temporary switching permitted/prohibited judging processing, which is executed by the LU set selection module according to the embodiment of this invention.

After LUs associated with any one of the modes are mounted in the manner described above, whether to switch modes is judged at various time points based on values that are held in entries where the value of the evaluation order 801 is "2" or larger as in Step 1203 of FIG. 12.

Specifically, whether to switch modes is judged first based on values that are held in an entry where the value of the evaluation order 801 is "2". In the case where none of "O_PERF" and "O_PSAVE" are designated as a result, the judging is executed based on values that are held in an entry where the value of the evaluation order 801 is "3". The subsequent entries are processed in the same manner and, when no mode is designated by processing one entry, the judging is executed based on a mode designation of the next entry where the value of the evaluation order 801 is larger by one.

In the example of FIG. 8, in an entry where the value of the evaluation order 801 is "2" (entry 812), "specified upon opening", "O_PERF", and "O_PSAVE" are registered as the evaluation item 802, the performance-first condition 803, and the power-saving-first condition 804, respectively. In this case, whether to switch LU sets is judged based on a designation contained in a file open request.

Specifically, when "O_PERF" is designated upon file opening (for example, when an option to an open command or a flag argument of the open function contains "O_PERF"), a condition registered as the performance-first condition 803 is met. In the case where the mode set at that point is the power-saving-first mode, a switch from the power-saving-first mode to the performance-first mode is executed by unmounting LUs that are contained in the LU set 311 and mounting LUs that are contained in the LU set 321.

When "O_PSAVE" is designated upon file opening, a condition registered as the power-saving-first condition 804 is met. In the case where the mode set at that point is the performance-first mode, a switch from the performance-first mode to the power-saving-first mode is executed.

With the entry 811 and the entry 812, a mode can be set (or switched) explicitly through a mount command or the mount function, or through an open command or the open function. For example, when executing access that requires high performance, the user may designate the performance-first mode through a mount command or the mount function, or through an open command or the open function.

In an entry where the value of the evaluation order 801 is "3" (entry 813), "file attribute", "PERF", and "PSAVE" are registered as the evaluation item 802, the performance-first condition 803, and the power-saving-first condition 804, respectively. In this case, whether to switch LU sets is judged based on the attributes of a file.

Specifically, when any one of "PERF" and "PSAVE" is contained in meta data that indicates the attributes of a file specified by an open command or the open function, or a file designated as the access target, for example, the attributes of the file are judged by referring to the meta data. When the meta data indicating the attributes of the file contains "PERF", a condition registered as the performance-first condition 803 is met and the performance-first mode is set. When the meta data indicating the attributes of the file contains "PSAVE", a condition registered as the power-saving-first condition 804 is met and a switch to the power-saving-first mode is executed.

For instance, the system administrator can add "PERF" to meta data of a file that needs to be accessed at high speed. In this manner, a mode can be set separately for each file to be accessed.

In an entry where the value of the evaluation order 801 is "4" (entry 814), "environmental variable", "ENV_PERF", and "ENV_PSAVE" are registered as the evaluation item 802, the performance-first condition 803, and the power-saving-first condition 804, respectively. In this case, whether to switch LU sets is judged based on an environmental variable.

Specifically, when an environmental variable "ENV_PERF" is defined, or when a given value (e.g., 1) is specified for the environmental variable "ENV_PERF", a condition registered as the performance-first condition 803 is met and the performance-first mode is set. When an environmental variable "ENV_PSAVE" is defined, or when a given value (e.g., 1) is specified for the environmental variable "ENV_PSAVE", a condition registered as the power-saving-first condition 804 is met and a switch to the power-saving-first mode is executed.

In an entry where the value of the evaluation order 801 is "5" (entry 815), "parent process name" and "job scheduler name" are registered as the evaluation item 802 and the performance-first condition 803, respectively. In this case, whether or not the name of a parent process that has started up the currently executed job matches a name registered as the performance-first condition 803 is judged. When the two match, a condition registered as the performance-first condition 803 is met and a switch to the performance-first mode is executed. When the two do not match, a condition registered as the performance-first condition 803 is not met and mode switching is not executed.

In an entry where the value of the evaluation order 801 is "6" (entry 816), "executed job name" and "job1" are registered as the evaluation item 802 and the performance-first condition 803, respectively. In this case, whether or not the name of the currently executed job matches "job1" registered as the performance-first condition 803 is judged. When the two match, a condition registered as the performance-first condition 803 is met and a switch to the performance-first mode is executed.

With the entry 815 and the entry 816, a mode can be set based on the type of a job to be executed. For example, when a large-size job is registered in a job scheduler to be executed in a given time zone (e.g., at night), the name of this job scheduler may be registered as the performance-first condition 803 in the entry 815, or the name of the job itself may be registered as the performance-first condition 803 in the entry 816.

In evaluation according to the entries 815 and 816, an executed job name 907 and a parent process name 909 are in some cases not designated in the LU set selection hint information 141 which is received from the user and will be described later. To deal with that event, this embodiment provides an option of evaluation by process ID which is described next.

In evaluation by process ID, a parent name "job scheduler name" and an executed job name "job1" which are registered as the performance-first mode 803 are used to obtain the process ID of each process from process execution state information, which is managed by the OS. By judging whether or not the obtained process ID matches an executed job process ID 908 or a parent process ID 910 in the LU set selection hint information 141 described later, evaluation equivalent to the one according to the entries 815 and 816 can be made.

In an entry where the value of the evaluation order 801 is "7" (entry 817), "group ID" and "hpc" are registered as the evaluation item 802 and the performance-first condition 803, respectively. In this case, whether or not the name of a group to which a user who has executed the current job belongs is "hpc" is judged. When the name of the group is "hpc", a condition registered as the performance-first condition 803 is met and a switch to the performance-first mode is executed.

In an entry where the value of the evaluation order 801 is "8" (entry 818), "user ID" and "foo, bar" are registered as the evaluation item 802 and the performance-first condition 803, respectively. In this case, whether or not the name of a user who has executed the current job belongs is "foo" or "bar" is judged. When the name of the user is any one of "foo" or "bar", a condition registered as the performance-first condition 803 is met and a switch to the performance-first mode is executed.

With the entry 817 and the entry 818, a mode can be set based on the name of a user who accesses a file. For example, a user who executes access that requires high performance all the time may register his/her own user name or the name of a group to which he/she belongs as the performance-first condition 803.

The system administrator or users can register arbitrary values in the LU set switching condition information 134. For example, the entries 811 to 814 are for conditions that are set by the system administrator and common to all users, whereas the entries 815 to 818 can be set by users at their discretion. The LU set switching condition information 134 may further contain information set by the respective users in the entries 815 to 818.

FIG. 9 is an explanatory diagram of the LU set selection hint information 141 according to the embodiment of this invention.

The LU set selection hint information 141 is created by the file system program 112 from a file operation request (e.g., file open request) received from a user, or the like, to be sent to the LU set management program 111.

Specifically, the LU set selection hint information 141 contains a used file path name 901, a specified-upon-file-use option 902, a used file attribute 903, an environmental variable 904, a job executing user ID 905, a job executing group ID 906, the executed job name 907, the executed job process ID 908, the parent process name 909, and the parent process ID 910.

The LU set management program 111 compares the received LU set selection hint information 141 against the LU set switching condition information 134 to judge whether or not a condition for executing mode switching (i.e., switching of LU sets) is met as in Step 1203 of FIG. 12.

To give a specific example, when the specified-upon-file-use option 902 contains "O_PERF" or "O_PSAVE", this value is compared against values registered in an entry of the LU set switching condition information 134 where the evaluation item 802 is "specified upon opening" (entry 812) in order to judge whether or not a mode switching condition is met. In the case where the specified-upon-file-use option 902 contains "O_PERF", for example, it is judged that a condition registered as the performance-first condition 803 in the entry 812 is met. Then, the performance-first mode is selected as will be described later.

Similarly, the used file attribute 903, the environmental variable 904, the job executing user ID 905, the job executing group ID 906, the executed job name 907, and the parent process name 909 correspond to the evaluation items "file attribute", "environmental variable", "user ID", "group ID", "executed job name", and "parent process name", respectively, in the LU set switching condition information 134.

Figure 10:
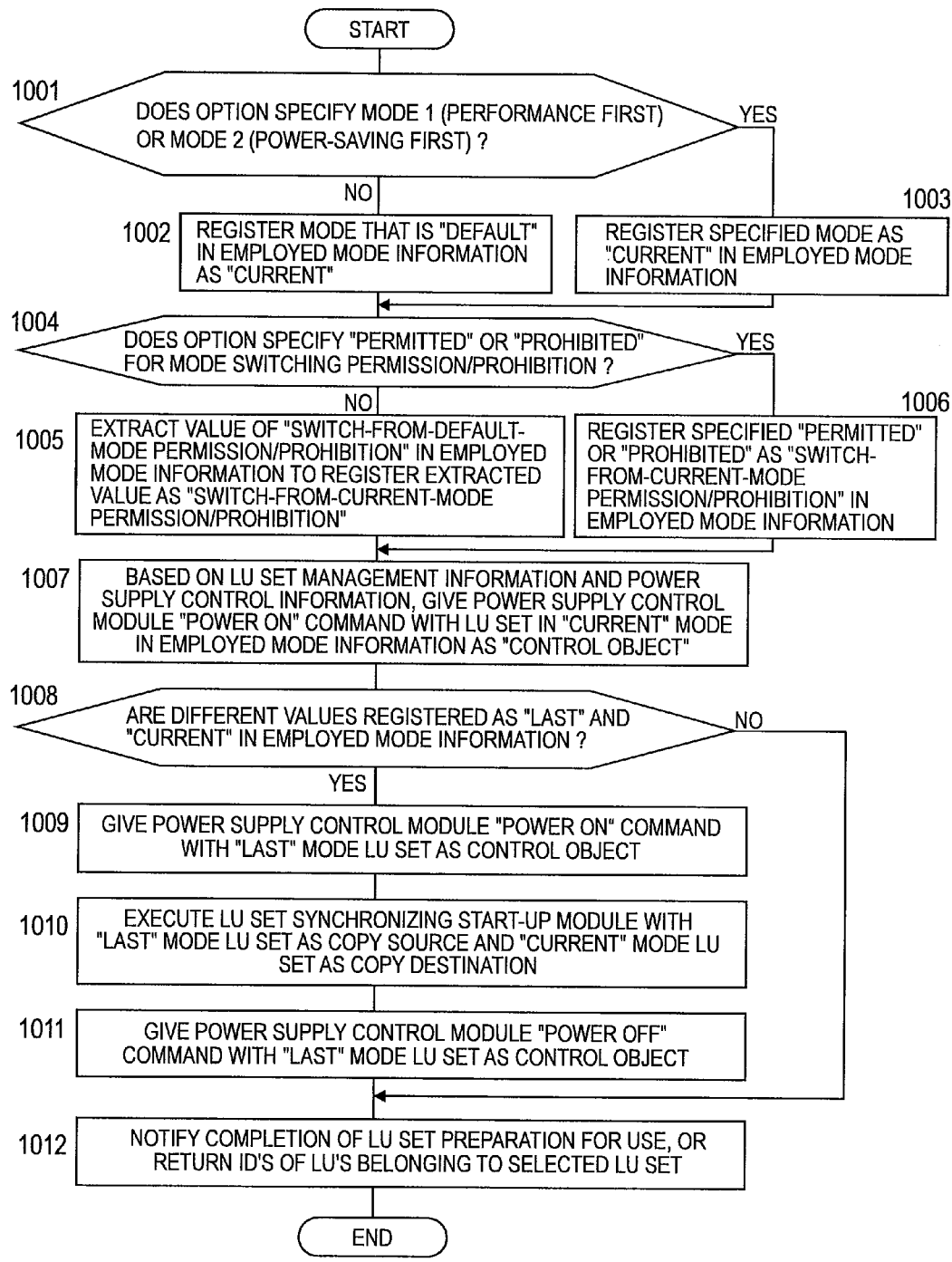
FIG. 10 is a flow chart showing processing that is executed by an LU set selection module when a mount request is issued according to the embodiment of this invention.

FIG. 10 is a flow chart showing processing that is executed by the LU set selection module 121 when a mount request is issued according to the embodiment of this invention.

Receiving a mount request, the LU set selection module 121 judges whether or not the performance-first mode or the power-saving-first mode is designated in an option to the mount request (Step 1001). The judging is executed by comparing the option to the mount request against values registered in an entry of the LU set switching condition information 134 where the evaluation item 802 is "specified upon mounting".

When it is judged in Step 1001 that none of the two modes are designated, the LU set selection module 121 sets a mode that is designated as the default mode 601 in the employed mode information 132 (Step 1002). For example, in the case where the power-saving-first mode is designated as the default mode 601 as shown in FIG. 6, the LU set selection module 121 sets the power-saving-first mode (by registering a value that is registered as the default mode 601 as the current mode 604 in the employed mode information 132).

On the other hand, when it is judged in Step 1001 that any one of the two modes is designated, the LU set selection module 121 registers the designated mode as the current mode 604 in the employed mode information 132 (Step 1003).

Next, the LU set selection module 121 judges if the option to the mount request specifies whether mode switching is permitted or prohibited (Step 1004).

When it is judged in Step 1004 that whether mode switching is permitted or prohibited is not specified, the LU set selection module 121 registers a value that is registered as the switch-from-default-mode permission/prohibition 602 in the employed mode information 132 ("permitted" in the example of FIG. 6) as the switch-from-current-mode permission/prohibition 605 (Step 1005).

On the other hand, when it is judged in Step 1004 that whether mode switching is permitted or prohibited is specified, the LU set selection module 121 registers the specified value (any one of "permitted" and "prohibited") as the switch-from-current-mode permission/prohibition 605 (Step 1006).

Next, the LU set selection module 121 designates, as a control object, an LU set that is associated with a mode registered as the current mode 604 in the employed mode information 132, and instructs the power supply control module 122 to power on the LU set (Step 1007).

Specifically, the LU set selection module 121 identifies from the LU set management information 131 LUs that are associated with a mode registered as the current mode 604. For example, in the case where the power-saving-first mode is registered as the current mode 604 as shown in FIG. 6, the LU 000 311a to the LU 033 311p (i.e., LU set 311) which are registered as the power-saving-first LU 503 of FIG. 5 are identified. Then, the LU set selection module 121 identifies from the power supply control information 133 a power supply control unit that contains the identified LUs. For example, in the case where the LU 000 311a to the LU 033 311p are identified as in the above example, the power supply control unit 00 331a to the power supply control unit 03 331d which contain the identified LUs are identified. The LU set selection module 121 instructs the power supply control module 122 to power on the identified power supply control unit 00 331a to the identified power supply control unit 03 331d.

Processing that the power supply control module 122 executes upon instructed to power on power supply control units will be described later with reference to FIG. 14.

Next, the LU set selection module 121 judges whether or not the value registered as the current mode 604 differs from the value registered as the last mode 603 in the employed mode information 132 (Step 1008).

When the value registered as the current mode 604 differs from the value registered as the last mode 603, it means that the LU set to be mounted this time (LU set identified in Step 1007) is not the same as the LU set mounted last time before this mounting is executed. In this case, there is a possibility that the latest data has not been stored yet in the LU set to be mounted this time.

For example, when the mode designated in the last mounting is the performance-first mode, the mounted LUs are the ones contained in the LU set 321. When those LUs are unmounted after data stored in the LUs is updated, the latest data stored in the LU set 321 is not reflected on the LU set 311 at that point (in this case, a value indicating the performance-first mode is registered as the last mode 603 in the employed mode information 132). In the case where the power-saving-first mode is designated in this mounting, the latest data needs to be reflected on the LU set 311 which is associated with the power-saving-first mode.

For that reason, when the value registered as the current mode 604 differs from the value registered as the last mode 603, the LU set selection module 121 designates as a control object an LU set that is associated with a mode registered as the last mode 603 in the employed mode information 132, and instructs the power supply control module 122 to power on the LU set (Step 1009). The control object LUs are identified in the same manner as in Step 1007.

Next, the LU set selection module 121 designates, as the copy source, an LU set that is associated with a mode registered as the last mode 603 and, as the copy destination, an LU set that is associated with a mode registered as the current mode 604 to execute the LU set synchronizing start-up module 123 (Step 1010). Processing that is executed by the LU set synchronizing start-up module 123 in this step will be described later with reference to FIG. 13.

Then, the LU set selection module 121 designates as a control object an LU set that is associated with a mode registered as the last mode 603 in the employed mode information 132, and instructs the power supply control module 122 to power off the LU set (Step 1011). Processing that the power supply control module 122 executes upon receiving this instruction will be described later with reference to FIGS. 14 to 16.

Next, the LU set selection module 121 sends a notification informing that the preparation of the LU set for use has been completed (Step 1012). As the notification, the LU set selection module 121 may send the identifiers of the LUs belonging to the selected LU set (LUs identified in Step 1007).

On the other hand, when it is judged in Step 1008 that the value registered as the current mode 604 is the same as the value registered as the last mode 603, it means that the LUs identified in Step 1007 are storing the latest data. Then, Steps 1009 to 1011 are skipped and Step 1012 is executed.

As a result of executing Step 1012, the identifiers of the LUs belonging to the selected LU set are registered as the selected LU ID 2502 in the selected LU set information 421. For example, when the LU set 321 is chosen, the identifiers "100" to "430" of the LU 100 321a to the LU 430 321p which belong to the LU set 321 are registered as shown in FIG. 25.

The processing executed by the LU set selection module 121 when a mount request is issued is thus completed.

Figure 11:
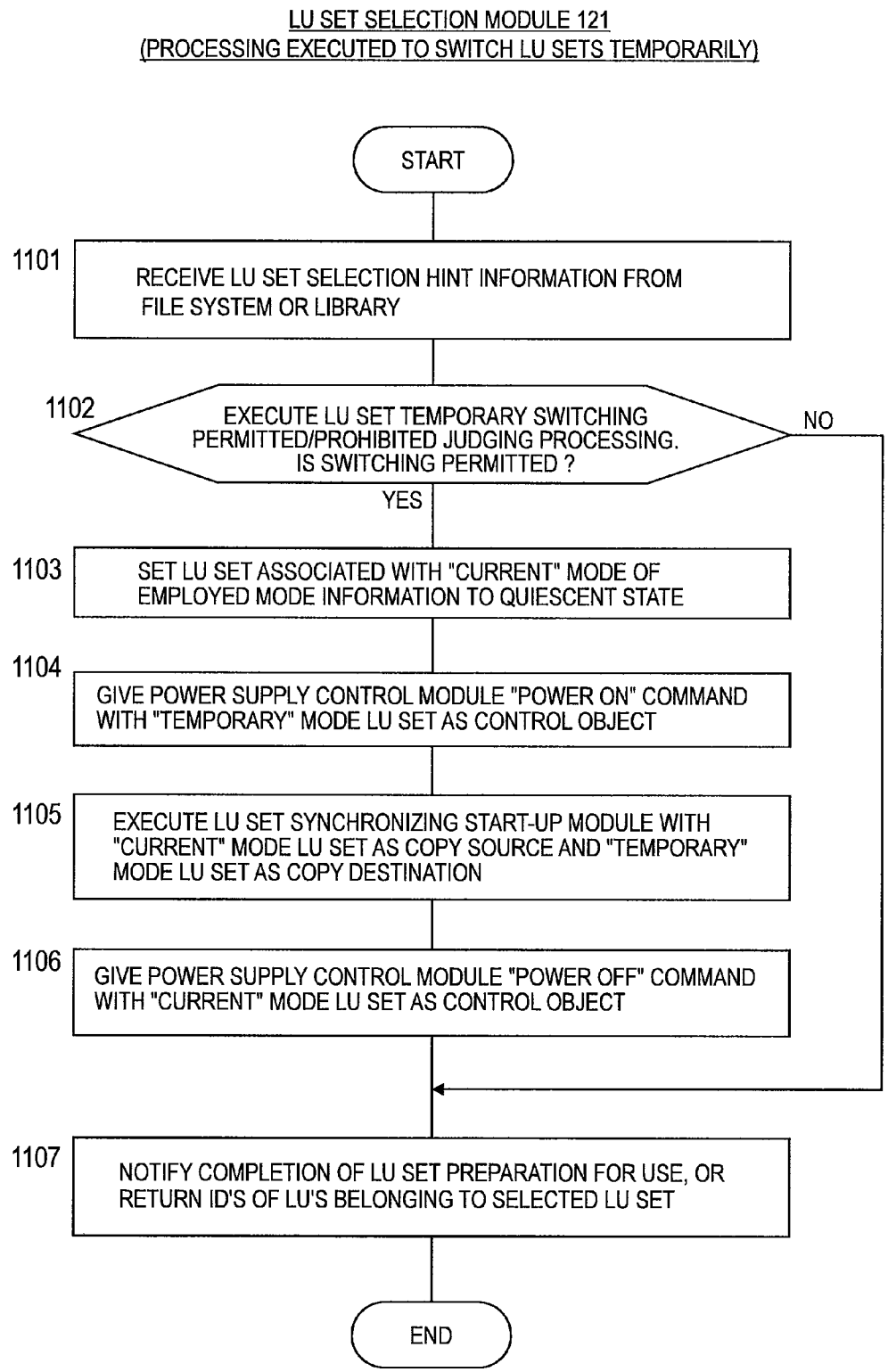
FIG. 11 is a flow chart showing processing that is executed by the LU set selection module when LU sets are switched temporarily according to the embodiment of this invention.

FIG. 11 is a flow chart showing processing that is executed by the LU set selection module 121 when LU sets are switched temporarily according to the embodiment of this invention.

First, the LU set selection module 121 receives the LU set selection hint information 141 from the file system program 112 (Step 1101).

Next, the LU set selection module 121 judges whether to execute temporary switching of LU sets (temporary mode switching) (Step 1102). Specifically, the LU set selection module 121 executes LU set temporary switching permitted/prohibited judging processing, which will be described later with reference to FIG. 12.

When it is judged in Step 1102 that temporary switching of LU sets is to be executed, the LU set selection module 121 sets an LU set that is associated with a mode registered as the current mode 604 in the employed mode information 132 (in examples of FIG. 6 and FIG. 5, LU set 311) to a quiescent state (Step 1103). Setting an LU set to a quiescent state means stopping of I/O to and from the LU set. In the case where the OS is holding data that is going to be written in an LU belonging to an LU set, the data is written in the LU before I/O to and from the LU set is stopped.

Next, the LU set selection module 121 designates, as a control object, an LU set that is associated with a mode registered as the temporary mode 606 in the employed mode information 132 (in examples of FIG. 6 and FIG. 5, LU set 321 which is associated with performance-first mode), and instructs the power supply control module 122 to power on the LU set (Step 1104).

Next, the LU set selection module 121 designates, as the copy source, an LU set that is associated with a mode registered as the current mode 604 and, as the copy destination, an LU set that is associated with a mode registered as the temporary mode 606 to execute the LU set synchronizing start-up module 123 (Step 1105).

Next, the LU set selection module 121 designates, as a control object, an LU set that is associated with a mode registered as the current mode 604 in the employed mode information 132, and instructs the power supply control module 122 to power off the LU set (Step 1106).

Next, the LU set selection module 121 sends a notification informing that the preparation of the LU set for use has been completed (Step 1107). As the notification, the LU set selection module 121 may send the identifiers of the LUs belonging to the selected LU set (LUs designated in Step 1104).

When it is judged in Step 1102 that temporary switching of LU sets is not to be executed, on the other hand, the LU set selection module 121 executes Step 1107, skipping Steps 1103 to 1106.

As a result of executing Step 1107, the identifiers of the LUs belonging to the selected LU set are registered as the selected LU ID 2502 in the selected LU set information 421, as in Step 1012 of FIG. 10.

The processing executed by the LU set selection module 121 when an open request is issued is thus completed.

FIG. 12 is a flow chart showing the LU set temporary switching permitted/prohibited judging processing, which is executed by the LU set selection module 121 according to the embodiment of this invention.

The LU set temporary switching permitted/prohibited judging processing shown in FIG. 12 is executed in Step 1102 of FIG. 11.

First, the LU set selection module 121 judges whether or not the value of the switch-from-current-mode permission/prohibition 605 in the employed mode information 132 is "permitted".

When the value of the switch-from-current-mode permission/prohibition 605 is not "permitted", it means that temporary mode switching (temporary switching of LU sets) is not allowed. Then the LU set selection module 121 clears the value of the temporary mode 606 in the employed mode information 132 (Step 1208), returns a value indicating that temporary mode switching is not executed (for example, "prohibited") (Step 1209), and ends the LU set temporary switching permitted/prohibited judging processing. In the case where Step 1209 is executed, it is judged that temporary switching of LU sets is not executed in Step 1102 of FIG. 11.

When the value of the switch-from-current-mode permission/prohibition 605 is "permitted", it means that temporary mode switching is allowed. Then the LU set selection module 121 refers to the LU set management information 131 to judge whether or not a plurality of LU sets of different modes are registered in association with each other (Step 1202).

In the example of FIG. 5, the LU set 321 of performance-first mode and the LU set 311 of power-saving-first mode are registered in association with each other. In this case, it is judged in Step 1202 that a plurality of LU sets of different modes are registered in association with each other.

When it is judged in Step 1202 that a plurality of LU sets of different modes are not registered in association with each other, the LU set selection module 121 cannot execute temporary mode switching. Then the LU set selection module 121 executes Steps 1208 and 1209 and ends the LU set temporary switching permitted/prohibited judging processing.

When it is judged in Step 1202 that a plurality of LU sets of different modes are registered in association with each other, the LU set selection module 121 evaluates the LU set switching condition information 134 based on the LU set selection hint information 141, to thereby judge whether or not there is an LU set in the mode that satisfies a switching condition (i.e., whether or not a condition registered as the performance-first condition 803 or the power-saving-first condition 804 is met with respect to any evaluation item 802) (Step 1203). This is judged in the manner described above with reference to FIGS. 8 and 9.

When it is judged in Step 1203 that there is no LU set in the mode that satisfies a switching condition, the LU set selection module 121 does not need to execute temporary mode switching. Then the LU set selection module 121 executes Steps 1208 and 1209 and ends the LU set temporary switching permitted/prohibited judging processing.

When it is judged in Step 1203 that there is an LU set in the mode that satisfies a switching condition, the LU set selection module 121 registers a value indicating the mode that satisfies a switching condition as the temporary mode 606 in the employed mode information 132 (Step 1204).

Next, the LU set selection module 121 judges whether or not the value registered as the temporary mode 606 in the employed mode information 132 differs from the value registered as the current mode 604 (Step 1205).

When it is judged in Step 1205 that the value registered as the temporary mode 606 is the same as the value registered as the current mode 604, there is no need to switch modes. Then the LU set selection module 121 executes Steps 1208 and 1209 and ends the LU set temporary switching permitted/prohibited judging processing.

When it is judged in Step 1205 that the value registered as the temporary mode 606 differs from the value registered as the current mode 604, on the other hand, the LU set selection module 121 judges whether or not an LU set that is associated with a mode registered as the current mode 604 is being used (Step 1206). Specifically, the LU set selection module 121 refers to, for example, information indicating whether an LU can be unmounted which is managed by the OS to judge whether or not the unmounting is possible. When an LU can be unmounted, it is judged that the LU is not in use whereas it is judged that the LU is in use when the unmounting is not possible. Whether an LU can be unmounted may be judged from, for example, information obtained through a fuser command.

When it is judged in Step 1206 that an LU set that is associated with a mode registered as the current mode 604 is in use, a power supply control unit that contains LUs belonging to this LU set cannot be powered off. In other words, modes cannot be switched in this case. Then the LU set selection module 121 executes Steps 1208 and 1209 and ends the LU set temporary switching permitted/prohibited judging processing.

When it is judged in Step 1206 that an LU set that is associated with a mode registered as the current mode 604 is not in use, the LU set selection module 121 returns a value indicating that temporary mode switching is executed (for example, "permitted") (Step 1207), and ends the LU set temporary switching permitted/prohibited judging processing. In the case where Step 1207 is executed, it is judged that temporary switching of LU sets is executed in Step 1102 of FIG. 11.

Figure 13:
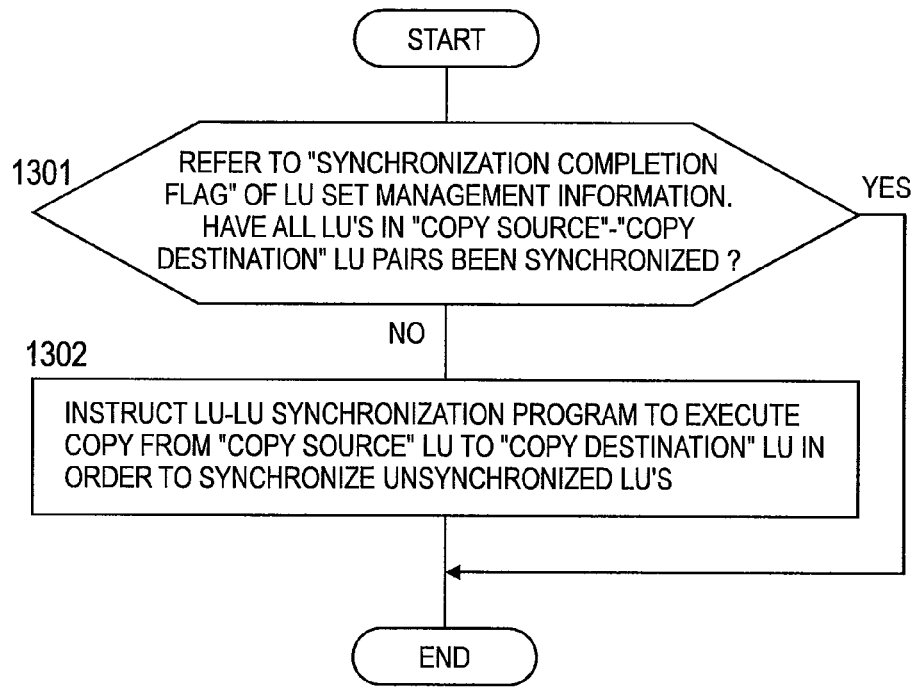
FIG. 13 is a flow chart showing processing that is executed by an LU set synchronizing start-up module according to the embodiment of this invention.

FIG. 13 is a flow chart showing processing that is executed by the LU set synchronizing start-up module 123 according to the embodiment of this invention.

The processing shown in FIG. 13 is executed in Step 1010 of FIG. 10 and Step 1105 of FIG. 11.

First, the LU set synchronizing start-up module 123 refers to the synchronization completion flag 504 of the LU set management information 131 to judge whether or not every LU pair consisting of an LU that is designated as the copy source and a corresponding LU that is designated as the copy destination has been synchronized (Step 1301).

When it is judged in Step 1301 that at least one LU pair has not been synchronized, it means that the latest data stored in one of the LUs that form this LU pair is not reflected on the other LU. Then the LU set synchronizing start-up module 123 sends an instruction about the unsynchronized LU pair to the LU-LU synchronization program 151 to synchronize the copy destination LU with the copy source LU (in other words, to copy data stored in the copy source LU to the copy destination LU) (Step 1302). After the copying is completed, the LU set synchronizing start-up module 123 updates the value of the synchronization completion flag 504 to "Yes" in an entry for the paired LUs between which the copying has been executed, and ends the processing.

When it is judged in Step 1301 that every LU pair has been synchronized, the LU set synchronizing start-up module 123 ends the processing without executing Step 1302.

Through the processing of FIG. 13, whether or not the LU set selected this time is the same as the previously selected LU set is judged. When the two are not the same, data in the previously selected LU set that is updated after the selection is made is copied to the LU set selected this time.

As will be described later with reference to FIGS. 18 and 19, in the case where the only data that differs between two associated LUs out of all data stored in the two associated LUs is one designated as data that does not need to be synchronized (e.g., meta data), the value of the synchronization completion flag 504 is "Yes". The copying for synchronization (Step 1302) is not executed in this case.

Figure 14:
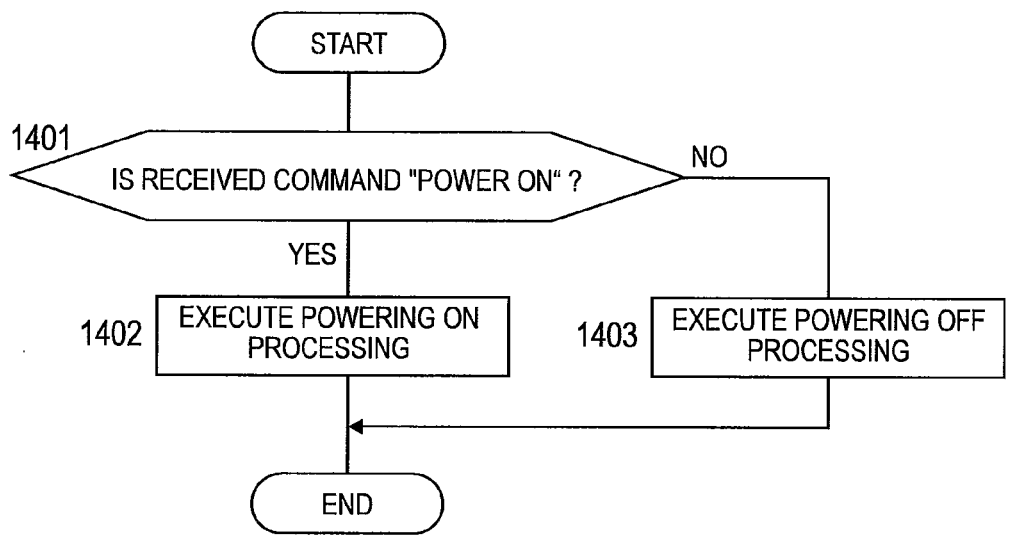
FIG. 14 is a flow chart showing processing that is executed by a power supply control module according to the embodiment of this invention.

FIG. 14 is a flow chart showing processing that is executed by the power supply control module 122 according to the embodiment of this invention.

The processing shown in FIG. 14 is executed by the power supply control module 122 upon reception of the instructions sent in Steps 1007, 1009, and 1011 of FIG. 10 and Steps 1104 and 1106 of FIG. 11.

First, the power supply control module 122 judges whether or not the received instruction is to power on (Step 1401).

When the received instruction is to power on, the power supply control module 122 executes powering on processing (Step 1402). The powering on processing will be described later with reference to FIG. 15.

When the received instruction is not a power-on instruction, it means that powering off is instructed. Then the power supply control module 122 executes powering off processing (Step 1403). The powering off processing will be described later with reference to FIG. 16.

Finishing Step 1402 or Step 1403, the power supply control module 122 ends the processing.

Figure 15:
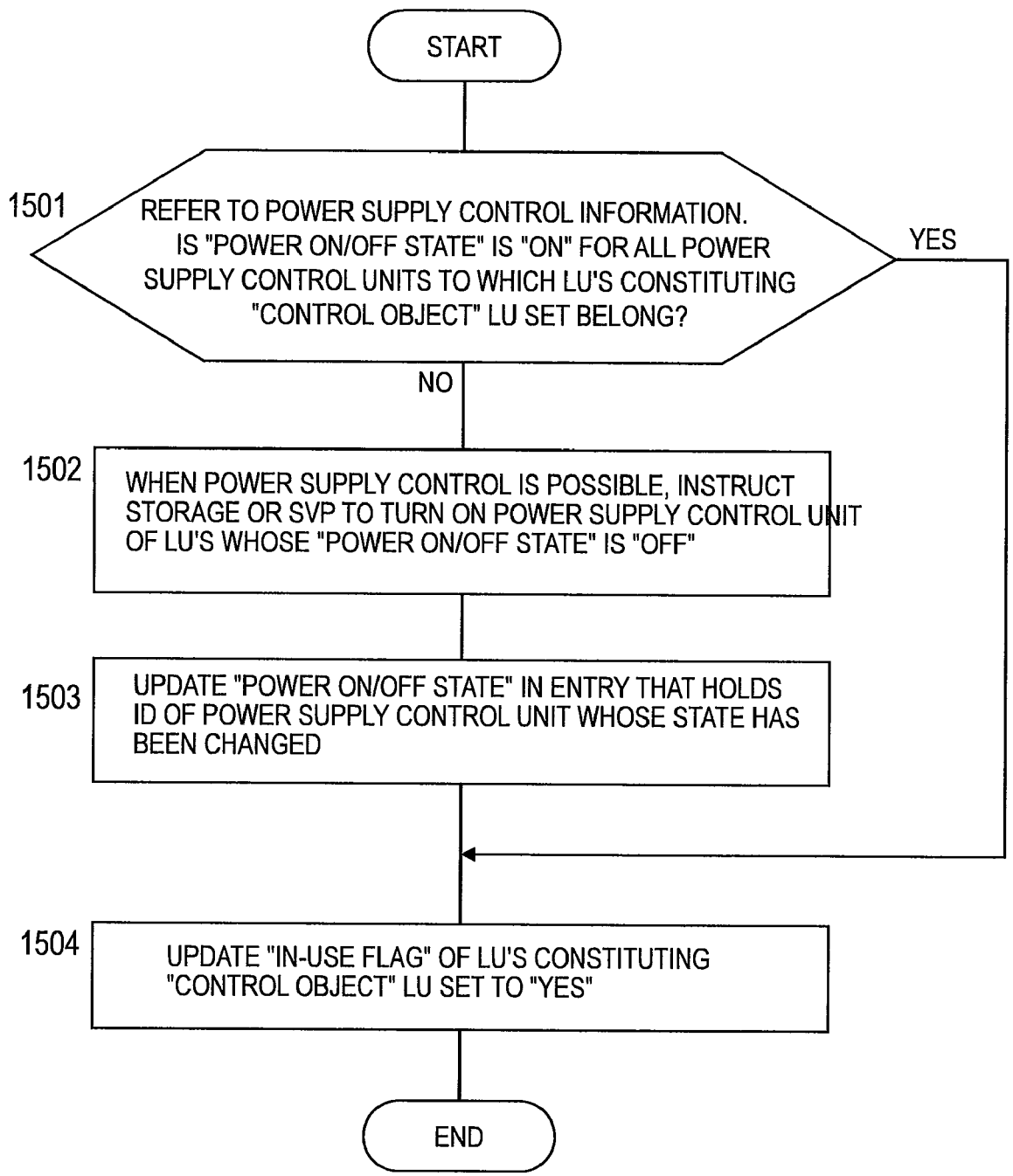
FIG. 15 is a flow chart showing a powering on processing which is executed by the power supply control module according to the embodiment of this invention.

FIG. 15 is a flow chart showing the powering on processing which is executed by the power supply control module 122 according to the embodiment of this invention.

The powering on processing is executed in Step 1402 of FIG. 14.

First, the power supply control module 122 refers to the power supply control information 133 to judge whether or not the power on/off state 705 is "ON" for every power supply control unit to which the LUs in an LU set designated as the control object belong (Step 1501).

When it is judged in Step 1501 that the power on/off state 705 is "OFF" for at least one of power supply control units to which the LUs in an LU set designated as the control object belong, the power supply control module 122 sends an instruction to the storage system 102 or the SVP 103 to power on any power supply control unit whose power on/off state 705 is "OFF" among power supply control units to which the LUs in an LU set designated as the control object belong (Step 1502).

However, power supply control units identified in Step 1502 may include one that is prohibited from being powered off. For instance, a power supply control unit that stores information necessary to manage the storage system 102 is set such that the power supply control unit is on all the time and is prohibited from being powered off. As for such power supply control units that are prohibited from being powered off, there is no need to send a power-on instruction in Step 1502.

In the case where the instruction in Step 1502 is sent to the SVP 103, the SVP 103 sends an instruction to the storage system 102 to power on a power supply control unit specified in the received instruction. The same applies to Step 1603 described later.

Next, the power supply control module 122 updates the value of the power on/off state 705 to "ON" in an entry for a power supply control unit that has been powered on as a result of the instruction given in Step 1502 (Step 1503).

Next, the power supply control module 122 updates the value of the in-use flag 702 to "Yes" for the LUs contained in the LU set that is designated as the control object (Step 1504).

When it is judged in Step 1501 that the power on/off state 705 is "ON" for every power supply control unit to which the LUs in the LU set designated as the control object belong, it means that the power of those power supply control units is already on. Then the power supply control module 122 executes Step 1504, skipping Steps 1502 and 1503.

After finishing Step 1504, the power supply control module 122 ends the powering on processing.

Figure 16:
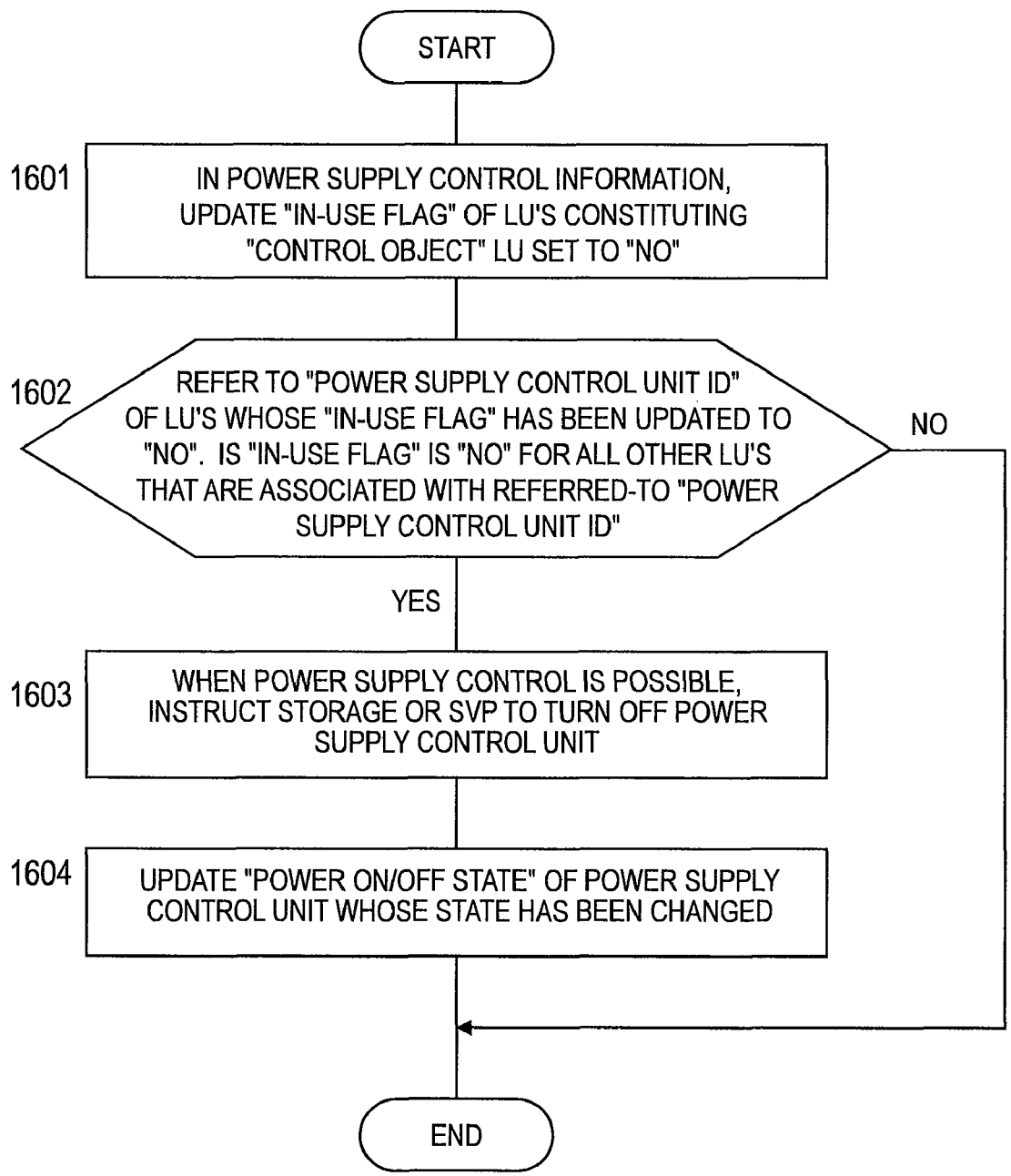
FIG. 16 is a flow chart showing a powering off processing which is executed by the power supply control module according to the embodiment of this invention.

FIG. 16 is a flow chart showing the powering off processing which is executed by the power supply control module 122 according to the embodiment of this invention.

The powering off processing is executed in Step 1403 of FIG. 14.

First, the power supply control module 122 refers to the power supply control information 133 to update the value of the in-use flag 702 to "No" for the LUs contained in the LU set that is designated as the control object (Step 1601).

Next, the power supply control module 122 refers to the value of the power supply control unit ID 704 in each entry for an LU, where the value of the in-use flag 702 has been updated to "No" in Step 1601. Then the power supply control module 122 judges whether or not the value of the in-use flag 702 is "No" for every LU that is associated with the referred-to value of the power supply control unit ID 704 (Step 1602).

For example, in the case where the value of the in-use flag 702 is updated in Step 1601 from "Yes" to "No" in an entry for the LU 000 311a, the power supply control module 122 judges in Step 1602 whether or not the value of the in-use flag 702 is "No" for other LUs stored in a power supply control unit that stores the LU 000 311a (in the examples of FIG. 7 and FIG. 3, the other LUs are the LU 001 311e, the LU 002 311i, and the LU 003 311m, which are stored in the chassis 00 331a).

When it is judged in Step 1602 that the value of the in-use flag 702 is "No" for every LU that fits the criterion (in other words, a power supply control unit that stores an LU whose value of the in-use flag 702 has been updated to "No" in Step 1601 contains only LUs that are not in use), the power supply control unit containing those LUs can be powered off. Then the power supply control module 122 sends an instruction to the storage system 102 or the SVP 103 to power off a power supply control unit that contains LUs for which the value of the in-use flag 702 has been updated to "No" in Step 1601 (Step 1603). The spinning of the disks is thus stopped in an HDD to which an LU selected to be accessed is not allocated.

However, in the case where this power supply control unit is prohibited from being powered off, the power supply control module 122 does not send the instruction in Step 1603.

Next, the power supply control module 122 updates the value of the power on/off state 705 to "OFF" for a power supply control unit that has been powered off in Step 1603 (Step 1604).

After finishing Step 1604, the power supply control module 122 ends the powering off processing.

On the other hand, when it is judged in Step 1602 that the value of the in-use flag 702 is "Yes" for at least one of LUs that fit the criterion, it means that a power supply control unit that stores an LU whose value of the in-use flag 702 has been updated to "No" in Step 1601 contains at least one LU that is in use. In this case, the power supply control unit containing an LU whose value of the in-use flag 702 has been updated to "No" in Step 1601 cannot be powered off. Then the power supply control module 122 ends the powering off processing without executing Steps 1603 and 1604.

Figure 17:
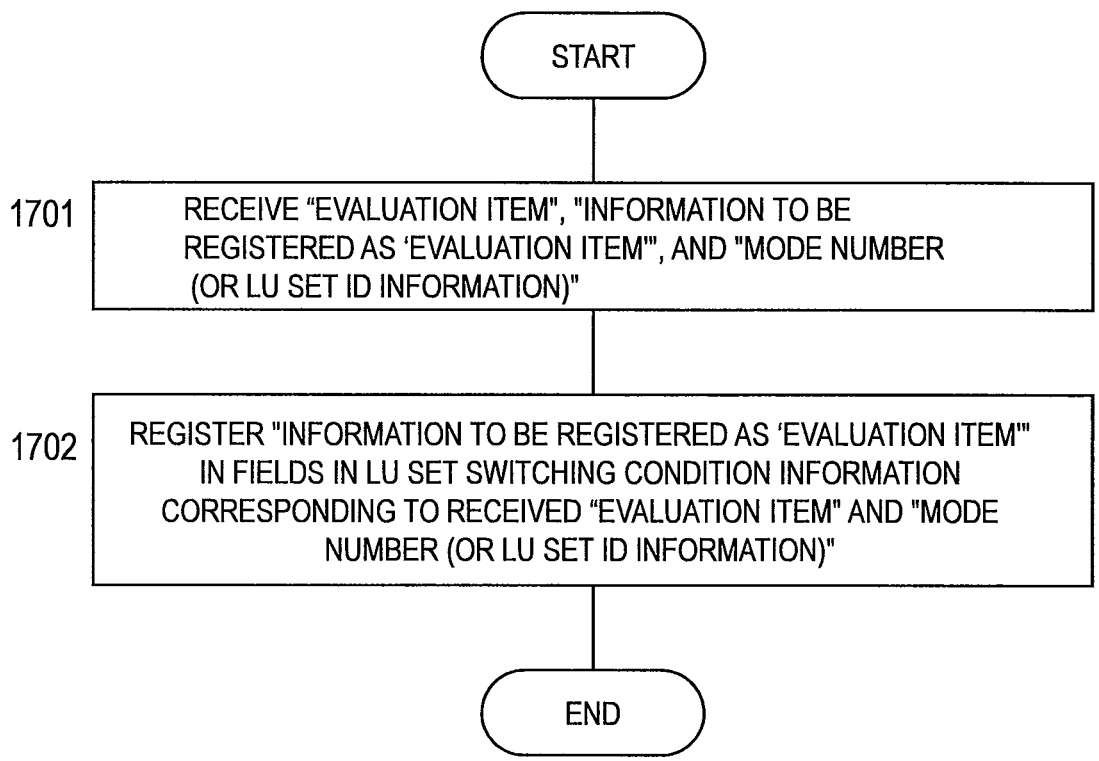
FIG. 17 is a flow chart showing processing that is executed by a switching condition registration module according to the embodiment of this invention.

FIG. 17 is a flow chart showing processing that is executed by the switching condition registration module 124 according to the embodiment of this invention.

The switching condition registration module 124 executes the processing shown in FIG. 17 in order to register in the LU set switching condition information 134. The processing of FIG. 17 may be executed at an arbitrary time point. For example, the processing of FIG. 17 may be executed before the computer system shown in FIG. 1 is put into operation. The processing of FIG. 17 may also be executed at an arbitrary time point in order to change information registered in the LU set switching condition information 134.

First, the switching condition registration module 124 receives an evaluation item, information to be registered as an evaluation item, and mode identification information that is associated with the information to be registered as an evaluation item (or identification information of LU set that is associated with mode) (Step 1701). Those pieces of information may be entered to the host computer 101 by the system administrator or a user, for example.

Next, the switching condition registration module 124 registers the information received in Step 1701 in the LU set switching condition information 134 (Step 1702). Specifically, the switching condition registration module 124 registers the received evaluation item as the evaluation item 802. The switching condition registration module 124 registers the information to be registered as an evaluation item as the performance-first condition 803 or the power-saving-first condition 804. Which of the performance-first condition 803 and the power-saving-first condition 804 is chosen is determined from the received mode identification information.

For example, when the switching condition registration module 124 receives in Step 1701 "specified upon mounting" as an evaluation item, "perf" as information to be registered as an evaluation item associated with the performance-first mode, and "psave" as information to be registered as an evaluation item associated with the power-saving-first mode, the switching condition registration module 124 registers "specified upon mounting", "perf", and "psave" as the evaluation item 802, the performance-first condition 803, and the power-saving-first condition 804, respectively, in the LU set switching condition information 134 shown in FIG. 8.

Next, referring to FIGS. 18 to 21, processing of managing update of sub-data (e.g., sub-data 1 431a to sub-data 16 431p) and information that is used in the processing are described.

As has been described with reference to FIG. 5, when data stored in one of two LUs that are associated with one piece of sub-data is updated, the synchronization completion flag 504 is updated to "No" in an entry for this sub-data. Synchronization processing shown in FIG. 13 is thereafter executed for the LU pair whose synchronization completion flag 504 is "No".

In practice, however, not all of data stored in LUs that form an LU pair as the one described above needs to be synchronized. It is generally unnecessary to synchronize information that indicates file management attributes (information indicating attributes of file, meta data of file system of entire storage space, and the like). To give a specific example, when an LU is mounted, management information indicating that the mounting has been executed is written in the LU, and management information as this does not need to be copied to other LUs.

Figure 18:
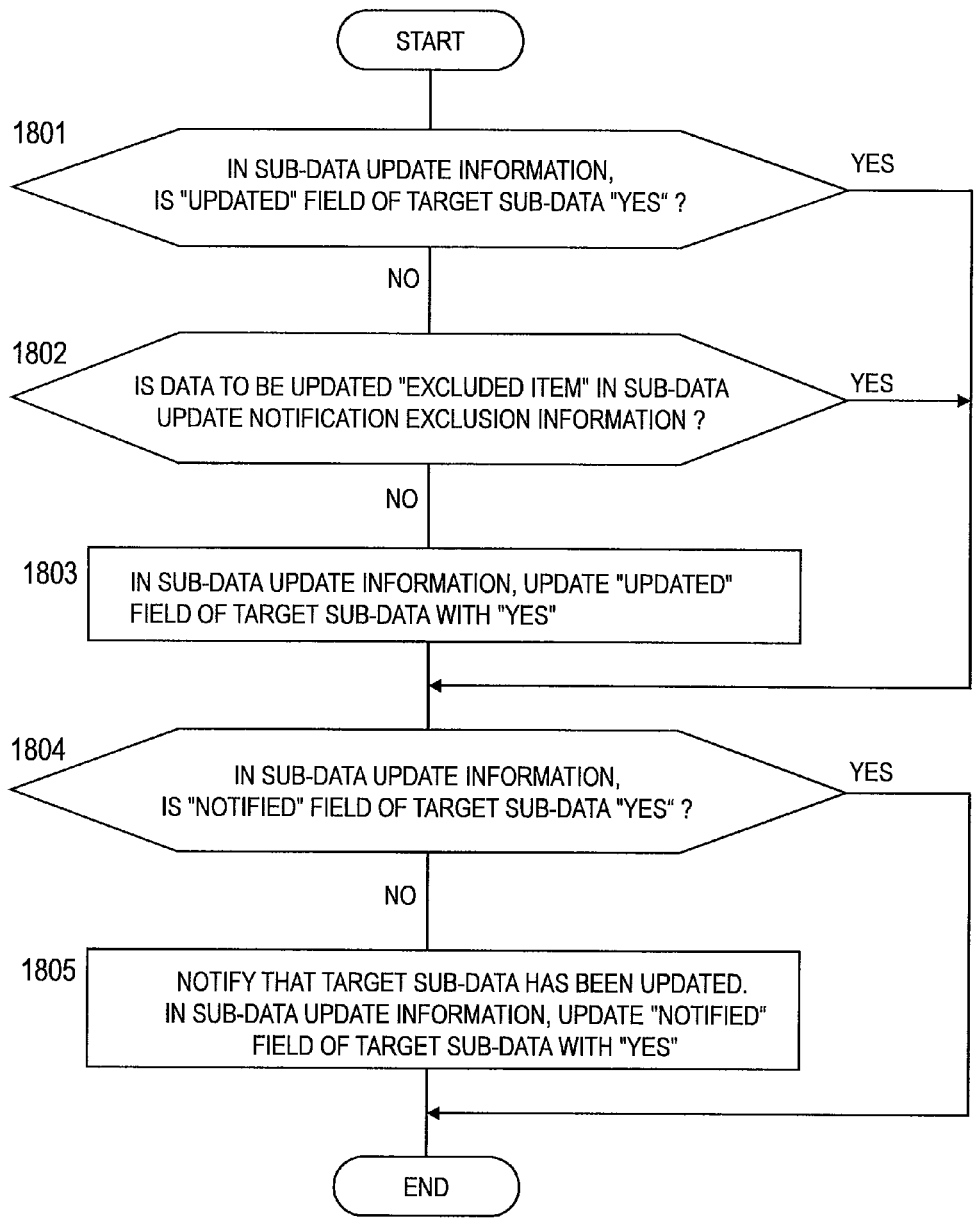
FIG. 18 is a flow chart showing processing that is executed by a sub-data update information management module according to the embodiment of this invention.
Figure 19:
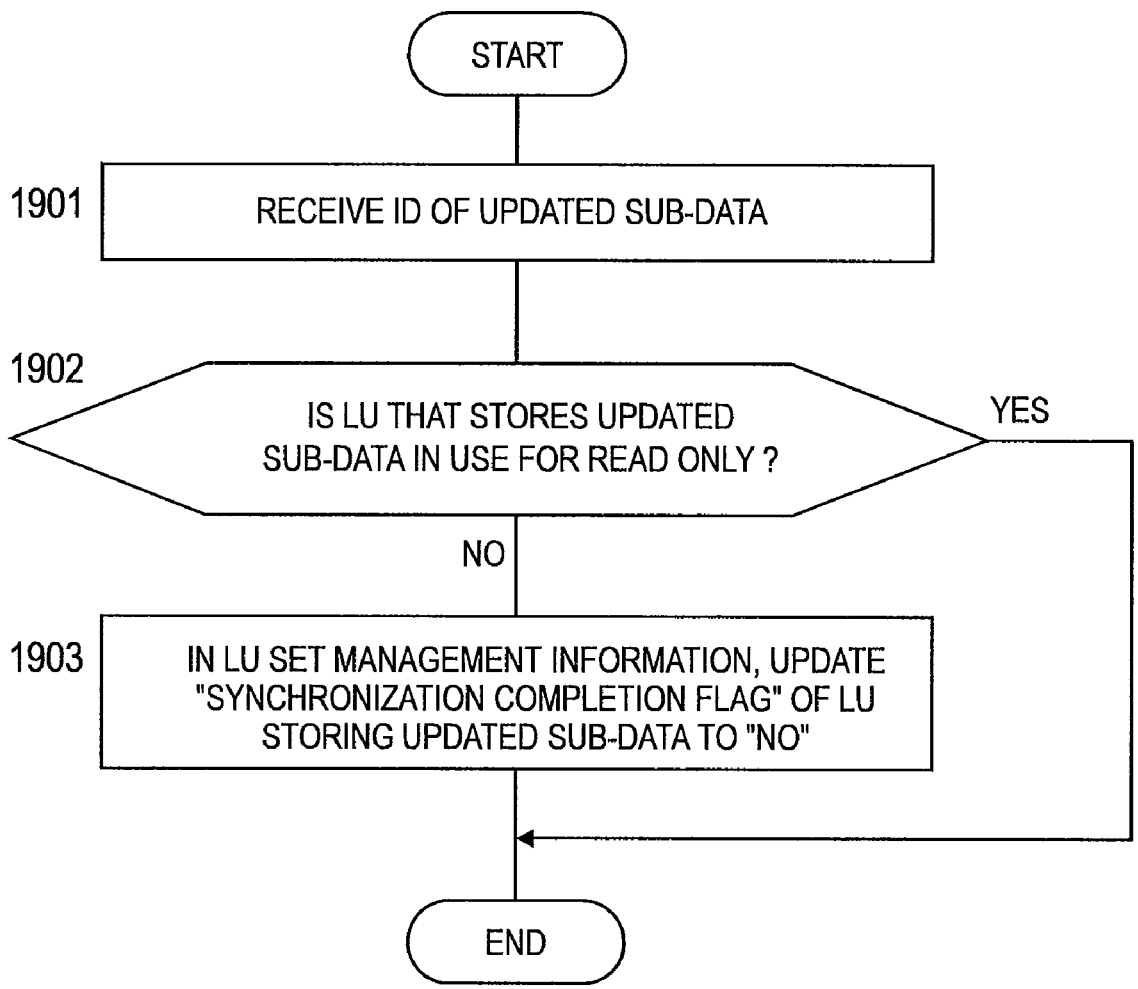
FIG. 19 is a flow chart showing processing that is executed by an LU update information registration module according to the embodiment of this invention.

This embodiment includes processing of FIGS. 18 and 19 so that synchronization is executed only when data that needs to be synchronized is updated. Executing unnecessary synchronization can thus be avoided.

FIG. 20 is an explanatory diagram of the sub-data update notification exclusion information 135 according to the embodiment of this invention.

The sub-data update notification exclusion information 135 is used to manage data that does not need to be synchronized among data stored in the above LU pair. Specifically, the sub-data update notification exclusion information 135 contains a classification 2001 and an excluded item 2002.

The classification 2001 indicates a classification of data that does not need to be synchronized. In the example of FIG. 20, meta data, data (directory), and data (file) are registered as the classification 2001.

The excluded item 2002 is information for identifying data that does not need to be synchronized.

For example, in an entry of FIG. 20 where the value of the classification 2001 is "meta data" as shown in an entry 2011, "upon-mounting update information" and "atime (access time)" are registered as the excluded item 2002. This indicates that, out of meta data (i.e., data for managing sub-data) stored in an LU, upon-mounting update information and information indicating an access time do not need to be synchronized. The upon-mounting update information here is, for example, information indicating that the LU has been mounted.

In an entry of FIG. 20 where the value of the classification 2001 is "data (directory)" as shown in an entry 2012, "/tmp" is registered as the excluded item 2002. This indicates that, out of data stored in an LU, data of a file under a directory "/tmp" does not need to be synchronized.

In an entry of FIG. 20 where the value of the classification 2001 is "data (file)" as shown in an entry 2013, "/large/log" and "/large/messages" are registered as the excluded item 2002. This indicates that, out of data stored in an LU, data of files "/large/log" and "/large/messages" does not need to be synchronized.

FIG. 21 is an explanatory diagram of the sub-data update information 142 according to the embodiment of this invention.

The sub-data update information 142 is information for managing update of data that is contained in each piece of sub-data (i.e., data stored in LUs that are associated with each piece of sub-data). Specifically, the sub-data update information 142 contains sub-data 2101, an updated flag 2102, and a notified flag 2103.

The sub-data 2101 indicates the identifier of each piece of sub-data. For example, the sub-data labels "1" to "16" of the sub-data 1 431a to the sub-data 16 431p are registered as the sub-data 2101.

The updated flag 2102 is information that indicates whether or not data contained in each piece of sub-data has been updated. A value "Yes" registered as the updated flag 2102 indicates that the data has been updated.

The notified flag 2103 is information that indicates whether or not the LU set management program 111 has been notified of an update of data contained in each piece of sub-data after the update. A value "Yes" registered as the notified flag 2103 indicates that the update has been notified.

The sub-data update information 142 may be created when, for example, sub-data is newly associated with LUs that belong to one of two associated LU sets. At that point, the two LU sets are synchronized and the initial values of the updated flag 2102 and the notified flag 2103 are therefore "No".

FIG. 18 is a flow chart showing processing that is executed by the sub-data update information management module 143 according to the embodiment of this invention.

The processing shown in FIG. 18 is executed by the sub-data update information management module 143 when the file system program 112 executes write processing.

First, the sub-data update information management module 143 refers to the sub-data update information 142 to judge whether or not the value of the updated flag 2102 is "Yes" in an entry for sub-data in which data is to be written through the write processing (Step 1801).

When it is judged in Step 1801 that the value of the updated flag 2102 is "No", the sub-data update information management module 143 judges whether or not the updated data corresponds to the excluded item 2002 in the sub-data update notification exclusion information 135 (Step 1802).

When it is judged in Step 1802 that the updated data does not correspond to the excluded item 2002, it means that the updated data is data that needs to be synchronized. Then the sub-data update information management module 143 updates the value of the updated flag 2102 in Step 1803 to "Yes" in the entry for this sub-data.

When it is judged in Step 1802 that the updated data corresponds to the excluded item 2002, it means that the updated data is data that does not need to be synchronized. Then the sub-data update information management module 143 proceeds to Step 1804, skipping Step 1803.

When it is judged in Step 1801 that the value of the updated flag 2102 is "Yes", it automatically means that the updated data is data that needs to be synchronized. Then the sub-data update information management module 143 proceeds to Step 1804, skipping Steps 1802 and 1803.

When it is judged in Step 1804 that the value of the notified flag 2103 is "No", the sub-data update information management module 143 notifies the LU set management program 111 of the fact that data in the sub-data has been updated (Step 1805). The notification contains information for identifying the sub-data that contains the updated data (hereinafter, referred to as "updated sub-data"). The sub-data update information management module 143 also updates the value of the notified flag 2103 to "Yes" in the entry for the updated sub-data.

The processing of the sub-data update information management module 143 is thus completed.

The sub-data update information management module 143 ends the processing without executing Step 1805 when it is judged in Step 1804 that the value of the notified flag 2103 is "Yes", which means that the LU set management program 111 has already been notified of the existence of data that needs to be synchronized.

FIG. 18 shows that Steps 1801 to 1803 and Step 1804 are executed in succession. Alternatively, Steps 1804 and 1805 may be executed independently of Steps 1801 to 1803 at a different time point. In this case, a plurality of sub-data pieces that need to be synchronized can be notified to the LU set management program 111 at one time.

FIG. 19 is a flow chart showing processing that is executed by the LU update information registration module 125 according to the embodiment of this invention.

The LU update information registration module 125 executes the processing shown in FIG. 19 when receiving a notification that is sent in Step 1804 of FIG. 18.

First, the LU update information registration module 125 receives the identifier of updated sub-data (Step 1901). This identifier is contained in the notification sent in Step 1804 of FIG. 18.

Next, the LU update information registration module 125 judges whether or not an LU that stores the updated sub-data (LU associated with updated sub-data) is being used for Read Only (Step 1902).

When it is judged in Step 1902 that the LU that stores the updated sub-data is not being used for Read Only, it means that writing new data in this LU and updating data that is stored in this LU are allowed. Then the LU update information registration module 125 updates the synchronization completion flag 504 to "No" in an entry of the LU set management information 131 for the LU that stores the updated sub-data (Step 1903), and ends the processing.

When it is judged in Step 1902 that the LU that stores the updated sub-data is being used for Read Only, it means that writing new data in this LU and updating data that is stored in this LU are both prohibited. Then the LU update information registration module 125 ends the processing without executing Step 1903.

In the processing of FIGS. 18 and 19, the value of the synchronization completion flag 504 is updated to "No" for two LUs associated with each other when data stored in one of the two LUs is updated after processing of synchronizing the two (Step 1302 of FIG. 13) is executed. However, the value of the synchronization completion flag 504 remains "Yes" in the case where data that does not need to be synchronized (e.g., meta data) alone is updated.

In other words, among data held in two associated LUs whose value of the synchronization completion flag 504 is "No", at least some of data that needs to be synchronized differs between the two whereas, for two associated LUs whose value of the synchronization completion flag 504 is "Yes", at least data that needs to be synchronized out of all data held in the two LUs does not differ between the two.

Figure 22:
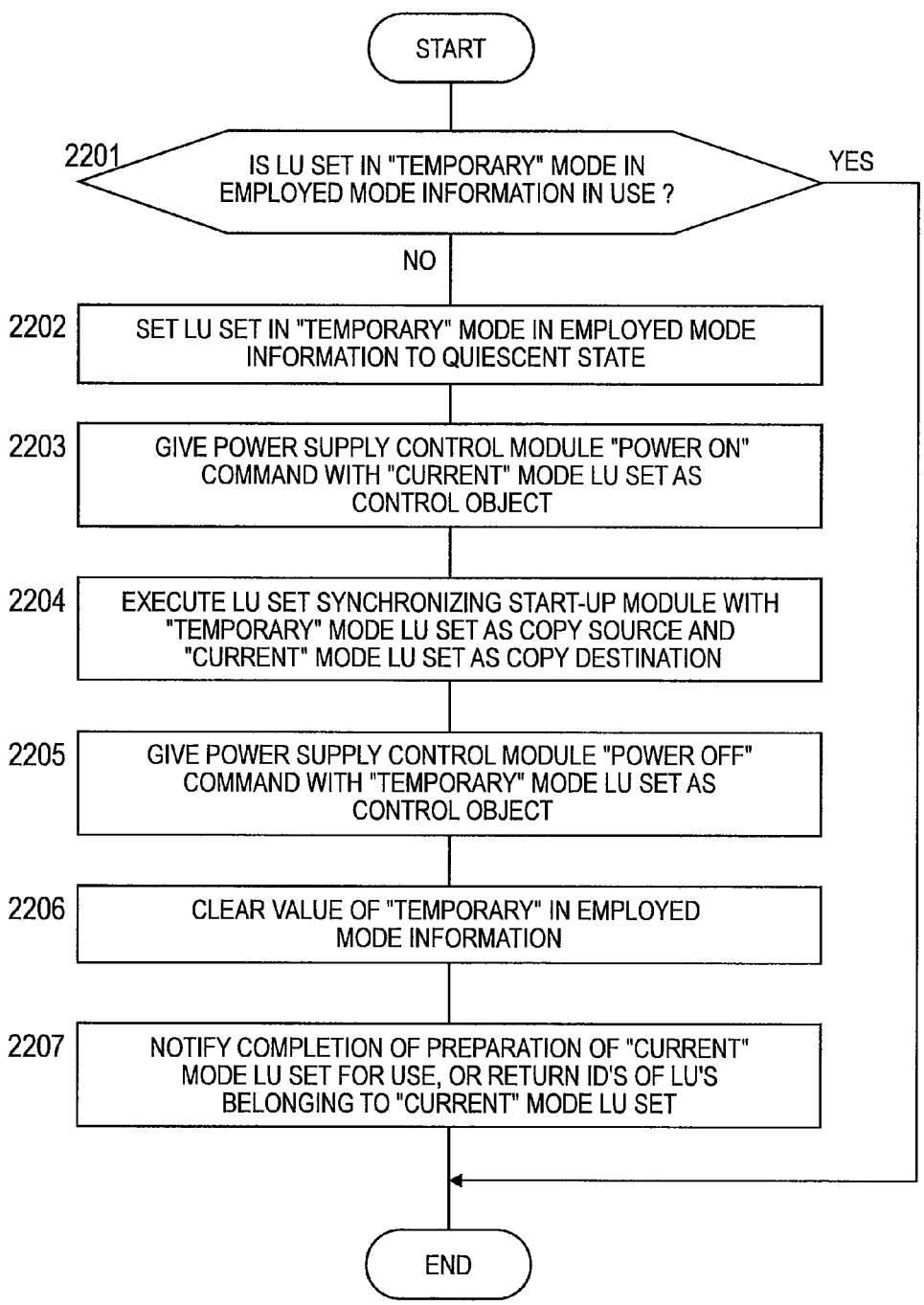
FIG. 22 is a flow chart showing processing that is executed by the LU set selection module to end the operation of a temporarily switched LU set according to the embodiment of this invention.

FIG. 22 is a flow chart showing processing that is executed by the LU set selection module 121 to end the operation of a temporarily switched LU set according to the embodiment of this invention.

Specifically, FIG. 22 shows processing executed in order to stop the operation of the switched LU set after a temporary switch of LU sets is made by the processing of FIG. 11 and start running the original LU set (LU set that is associated with mode registered as current mode 604) again.

First, the LU set selection module 121 judges whether or not an LU set that is associated with a mode registered as the temporary mode 606 in the employed mode information 132 (in examples of FIG. 6 and FIG. 5, LU set 321 which is associated with performance-first mode) is in use (Step 2201). Specifically, when the value of the in-use flag 702 is "No" for all LUs that belong to the LU set, it is judged that the LU set is not in use. When the value of the in-use flag 702 is "Yes" for at least one of LUs that belong to the LU set, on the other hand, it is judged that the LU set is in use.

When it is judged in Step 2201 that the LU set is not in use, the LU set selection module 121 makes the LU set quiescent (Step 2202).

Next, the LU set selection module 121 designates, as a control object, an LU set that is associated with a mode registered as the current mode 604 in the employed mode information 132 (in examples of FIG. 6 and FIG. 5, LU set 311 which is associated with power-saving-first mode), and instructs the power supply control part 252 to power on the LU set (Step 2203).

Next, the LU set selection module 121 designates, as the copy source, the LU set that is associated with the mode registered as the temporary mode 606 and, as the copy destination, the LU set that is associated with the mode registered as the current mode 604 to execute the LU set synchronizing start-up module 123 (Step 2204).

Next, the LU set selection module 121 designates, as a control object, the LU set that is associated with the mode registered as the temporary mode 606 in the employed mode information 132, and instructs the power supply control part 252 to power off the LU set (Step 2205).

Then, the LU set selection module 121 clears the value registered as the temporary mode 606 in the employed mode information 132 (Step 2206).

Next, the LU set selection module 121 sends a notification informing that the preparation of the LU set for use has been completed (Step 2207). As the notification, the LU set selection module 121 may send the identifiers of the LUs belonging to the LU set that is associated with the mode registered as the current mode 604.

As a result of executing Step 2207, the identifiers of the LUs belonging to the selected LU set are registered as the selected LU ID 2502 in the selected LU set information 421, as in Step 1012 of FIG. 10.

The LU set selection module 121 thus finishes the processing.

The LU set selection module 121 ends the processing without executing Steps 2202 to 2207 when it is judged in Step 2201 that the LU set is in use, which means that the LU set cannot be powered off.

As has been described, according to the embodiment of this invention, two LU sets that store the same data are used. LUs in one of those LU sets store data dispersedly among a relatively small number of power supply control units whereas LUs in the other LU set store data dispersedly among a relatively large number of power supply control units. Of reducing the power consumption of the storage system and improving the access performance of the storage system, which one is to be given priority is judged from conditions set at the system administrator's, or a user's, discretion. When the reduction in power consumption is given priority, the former LU set is used and, when the improvement in access performance is given priority, the latter LU set is used. In this way, power consumption and access performance can be optimized to suit the file type, the job type, or the like.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:

a computer; and a storage system coupled to the computer through a network, wherein:

the computer has an interface, which is coupled to the network, a processor, which is coupled to the interface, and a memory, which is coupled to the processor;

the storage system has a plurality of disk drives and a controller, which controls the plurality of disk drives;

the plurality of disk drives provide a data storage area that is partitioned into a plurality of logical volumes;

the plurality of logical volumes include a first number of first logical volumes and as many second logical volumes as the first number;

each of the plurality of logical volumes belongs to one of a plurality of volume sets;

the plurality of volume sets include a first volume set to which the first number of the first logical volumes belong and a second volume set to which the first number of the second logical volumes belong;

the first number of the first logical volumes are allocated dispersedly to a second number of the disk drives;

the first number of second logical volumes are allocated dispersedly to a third number of the disk drives, the third number being larger than the second number; and the computer holds management information which associates each of the first logical volumes and each of the second logical volumes with each other, and is configured to:

select one of the first volume set and the second volume set based on a result of judging whether or not a predetermined condition is met;

store data of a file dispersedly in the first number of the logical volumes belonging to the selected volume set; and send an instruction to the storage system to stop spinning of disks in the disk drives to which none of the first number of the logical volumes belonging to the selected volume set are allocated.

2. The computer system according to claim 1, wherein the computer is further configured to:

judge, when the one of the first volume set and the second volume set is selected, whether or not the volume set selected this time is the same as a volume set that has been selected previously; and send, when it is judged that the volume set selected this time differs from the volume set that has been selected previously, an instruction to the storage system to copy data stored in each of the logical volumes that belongs to the volume set that has been selected previously to each of the logical volumes that belongs to the volume set selected this time.

3. The computer system according to claim 2, wherein the computer is further configured to:

judge, when it is judged that the volume set selected this time differs from the volume set that has been selected previously, whether or not data has been updated in one of the logical volumes that belong to the volume set that has been selected previously and the logical volumes that belong to the volume set selected this time after the copying has been executed last time between the logical volumes that belong to the volume set that has been selected previously and the logical volumes that belong to the volume set selected this time; and send, when it is judged that data has been updated in one of the logical volumes that belong to the volume set that has been selected previously and the logical volumes that belong to the volume set selected this time after the copying has been executed last time, an instruction to the storage system to copy data stored in each of the logical volumes that belongs to the volume set that has been selected previously to each of the logical volumes that belongs to the volume set selected this time.

4. The computer system according to claim 3, wherein the computer is configured to judge that, after the execution of the copying last time, data has not been updated in one of the logical volumes that belong to the volume set that has been selected previously and the logical volumes that belong to the volume set selected this time in a case where, out of data contained in the logical volumes that belong to the volume set that has been selected previously and the logical volumes that belong to the volume set selected this time, only data that has been updated after the copying has been executed last time is data that does not need to be synchronized, and wherein the data that does not need to be synchronized comprises at least meta data which indicates management attributes of a file stored in each of the logical volumes.

5. The computer system according to claim 1, wherein the computer is configured to judge whether or not the predetermined condition is met based on whether or not a received command contains predetermined information.

6. The computer system according to claim 1, wherein the computer is configured to judge whether or not the predetermined condition is met based on whether or not information indicating attributes of the file contains predetermined information.

7. The computer system according to claim 1, wherein the computer is configured to judge whether or not the predetermined condition is met based on whether or not information specified by an environmental variable contains predetermined information.

8. The computer system according to claim 1, wherein the computer is configured to judge whether or not the predetermined condition is met based on whether or not a parent job starting up a job that executes access to the file is a predetermined job.

9. The computer system according to claim 8, wherein the computer is configured to:

judge that the predetermined condition is met when the parent job starting up the job that executes the access to the file is a program that schedules when to execute jobs; and select the second volume set.

10. The computer system according to claim 1, wherein the computer is configured to judge whether or not the predetermined condition is met based on whether or not a job that executes access to the file is a predetermined job.

11. The computer system according to claim 1, wherein the computer is configured to judge whether or not the predetermined condition is met based on whether or not a user who accesses the file is a predetermined user.

12. The computer system according to claim 1, wherein the computer is configured to judge whether or not the predetermined condition is met based on whether or not a user who accesses the file belongs to a predetermined group.

13. A method of controlling a computer system which has a computer and a storage system coupled to the computer through a network, the computer having an interface, which is coupled to the network, a processor, which is coupled to the interface, and a memory, which is coupled to the processor, the storage system having a plurality of disk drives and a controller, which controls the plurality of disk drives, the plurality of disk drives providing a data storage area that is partitioned into a plurality of logical volumes, the plurality of logical volumes including a first number of first logical volumes and as many second logical volumes as the first number, each of the plurality of logical volumes belonging to one of a plurality of volume sets, the plurality of volume sets including a first volume set to which the first number of the first logical volumes belong and a second volume set to which the first number of the second logical volumes belong, the first number of the first logical volumes being allocated dispersedly to a second number of the disk drives, the first number of second logical volumes being allocated dispersedly to a third number of the disk drives, the third number being larger than the second number, the computer holding management information which associates each of the first logical volumes and each of the second logical volumes with each other, the method comprising:

a first step of selecting, by the computer, one of the first volume set and the second volume set based on a result of judging whether or not a predetermined condition is met;

a second step of storing, by the computer, data of a file dispersedly in the first number of the logical volumes belonging to the selected volume set; and a third step of sending, by the computer, an instruction to the storage system to stop spinning of disks in the disk drives to which none of the first number of the logical volumes belonging to the selected volume set are allocated.

14. The method according to claim 13, further comprising:

a fourth step of judging, when the one of the first volume set and the second volume set is selected, whether or not the volume set selected this time is the same as a volume set that has been selected previously; and a fifth step of sending, by the computer, when it is judged that the volume set selected this time differs from the volume set that has been selected previously, an instruction to the storage system to copy data stored in each of the logical volumes that belongs to the volume set that has been selected previously to each of the logical volumes that belongs to the volume set selected this time.

15. The method according to claim 13, wherein the first step includes the step of judging, by the computer, whether or not the predetermined condition is met based on whether or not a received command contains predetermined information.

16. The method according to claim 13, wherein the first step includes the step of judging, by the computer, whether or not the predetermined condition is met based on whether or not information specified by an environmental variable contains predetermined information.

17. The method according to claim 13, wherein the first step includes the step of judging, by the computer, whether or not the predetermined condition is met based on whether or not a parent job starting up a job that executes access to the file is a predetermined job.

18. The method according to claim 17, wherein the first step includes the steps of:

judging, by the computer, that the predetermined condition is met when the parent job starting up the job that executes the access to the file is a program for scheduling when to execute the job; and selecting, by the computer, the second volume set.

19. The method according to claim 13, wherein the first step includes the step of judging, by the computer, whether or not the predetermined condition is met based on whether or not a job that executes access to the file is a predetermined job.

20. The method according to claim 13, wherein the first step includes the step of judging, by the computer, whether or not the predetermined condition is met based on whether or not a user who accesses the file is a predetermined user.

* * * * *